United States Patent
Shibuya et al.

(10) Patent No.: US 8,059,863 B2
(45) Date of Patent: Nov. 15, 2011

(54) WORK MOVEMENT ANALYSIS METHOD, WORK MOVEMENT ANALYSIS APPARATUS, AND WORK MOVEMENT ANALYSIS PROGRAM

(75) Inventors: Tsutomu Shibuya, Hadano (JP); Toshiaki Seshimo, Iwafune (JP); Mitsuhiro Ota, Tokyo (JP); Shigeru Fujimori, Hachioji (JP)

(73) Assignee: Hitachi, Ltd., Tokyo (JP)

(*) Notice: Subject to any disclaimer, the term of this patent is extended or adjusted under 35 U.S.C. 154(b) by 1092 days.

(21) Appl. No.: 11/706,815

(22) Filed: Feb. 14, 2007

(65) Prior Publication Data

US 2007/0282479 A1    Dec. 6, 2007

(30) Foreign Application Priority Data

May 31, 2006 (JP) .................. 2006-150909

(51) Int. Cl.
  *G06K 9/00* (2006.01)
(52) U.S. Cl. ..................................... 382/103
(58) Field of Classification Search .......... 382/104, 382/103, 107, 236; 704/278; 348/143, 135, 348/155
  See application file for complete search history.

(56) References Cited

U.S. PATENT DOCUMENTS 5,969,755 A * 10/1999 Courtney ............... 348/143
2006/0122842 A1 * 6/2006 Herberger et al. ......... 704/278

FOREIGN PATENT DOCUMENTS

| JP | 04-182771 A | 6/1992 |
| JP | 06-168246 | 8/1994 |
| JP | 06-231137 | 8/1994 |
| JP | 06-231137 A | 8/1994 |

OTHER PUBLICATIONS

Toshiaki Yoshinaga, et al. "Computer Aided Construction Engineering System for Nuclear Power Plants" p. 27 to 38, No. 10. vol. 72, Oct. 1990.

* cited by examiner

*Primary Examiner* — Claire X Wang
(74) *Attorney, Agent, or Firm* — Kilpatrick Townsend & Stockton LLP

(57) ABSTRACT

The work movement analysis method for dividing a moving picture of a worker's work movement into a plurality of movement sections in an apparatus having display, storage, and processing units includes in the processing unit the steps of: defining a plurality of movement section classification buttons and providing the buttons to an operator; reproducing the moving picture in the display unit; allocating movement section identification information defined by a specific movement section classification button to a moving picture of a work; storing a position of a moving picture in the storage unit as an end position of a movement section; defining an end position of a previous movement section as a start position of the movement section and a reproduction start position of a moving picture of the work movement as the start position in a case of no end position, and dividing the work movement into the movement sections.

21 Claims, 13 Drawing Sheets

FIG.4

(Work movement Division Information)

| Cycle Sequence No. | Movement Group No. | Movement Group Name | Movement Element Cycle Sequence No. | Movement Element Name | Movement Section Identification (Movement Section Name) | Movement Start Time Position | Movement End Time Position | Reproduction Speed | Reproduction Skip Information | Rating Information |
|---|---|---|---|---|---|---|---|---|---|---|
| 1 | | | 1 | | 4 (Ignore) | 00:00.00 | 00:01.10 | | | |
| 1 | | | 1 | Preparation | 1 (Preparation) | 00:01.10 | 00:10.03 | 1 | 0 | 1 |
| 1 | | | 2 | Material Setting | 3 (Invalid) | 00:10.03 | 00:15.00 | 1 | 0 | 1 |
| 1 | | | 2 | Material Setting | 2 (Valid) | 00:15.00 | 00:25.10 | 1 | 0 | 1 |
| 1 | | | 3 | Screw Fastening | 3 (Invalid) | 00:25.10 | 00:30.10 | 1 | 0 | 1 |
| 1 | | | 3 | Screw Fastening | 2 (Valid) | 00:30.10 | 00:40.04 | 1 | 0 | 1 |
| 1 | | | 3 | Screw Fastening | 3 (Invalid) | 00:40.04 | 00:43.98 | 1 | 0 | 1 |
| 1 | | | 4 | Material Reset | 2 (Valid) | 00:43.98 | 00:50.92 | 1 | 0 | 1 |
| 1 | | | 4 | Material Reset | 3 (Invalid) | 00:50.92 | 00:55.04 | 1 | 0 | 1 |
| 2 | | | 1 | Preparation | 1 (Preparation) | 00:55.04 | 01:01.01 | 1 | 0 | 1 |

FIG.5

(Movement Element Analysis Information)

| Cycle Sequence No. | Movement Group No. | Movement Group Name | Movement Element Cycle Sequence No. | Movement Element Name | Movement Start Time Position | Movement End Time Position | Valid Time | Invalid Time | Accumulation Time | Reproduction Time | Reproduction Skip Information | Rating Information |
|---|---|---|---|---|---|---|---|---|---|---|---|---|
| 1 | | | 1 | Preparation | 00:01.10 | 00:10.03 | | 00:09.93 | 00:09.93 | 1 | 0 | 1 |
| 1 | | | 2 | Material Setting | 00:10.03 | 00:25.10 | 00:10.10 | 00:04.97 | 00:25.00 | 1 | 0 | 1 |
| 1 | | | 3 | Screw Fastening | 00:25.10 | 00:43.98 | 00:09.94 | 00:08.94 | 00:43.88 | 1 | 0 | 1 |
| 1 | | | 4 | Material Reset | 00:43.98 | 00:55.04 | 00:06.94 | 00:04.12 | 00:54.94 | 1 | 0 | 1 |
| 2 | | | 1 | Preparation | 00:55.04 | 01:01.01 | | 00:05.97 | 00:05.97 | 1 | 0 | 1 |

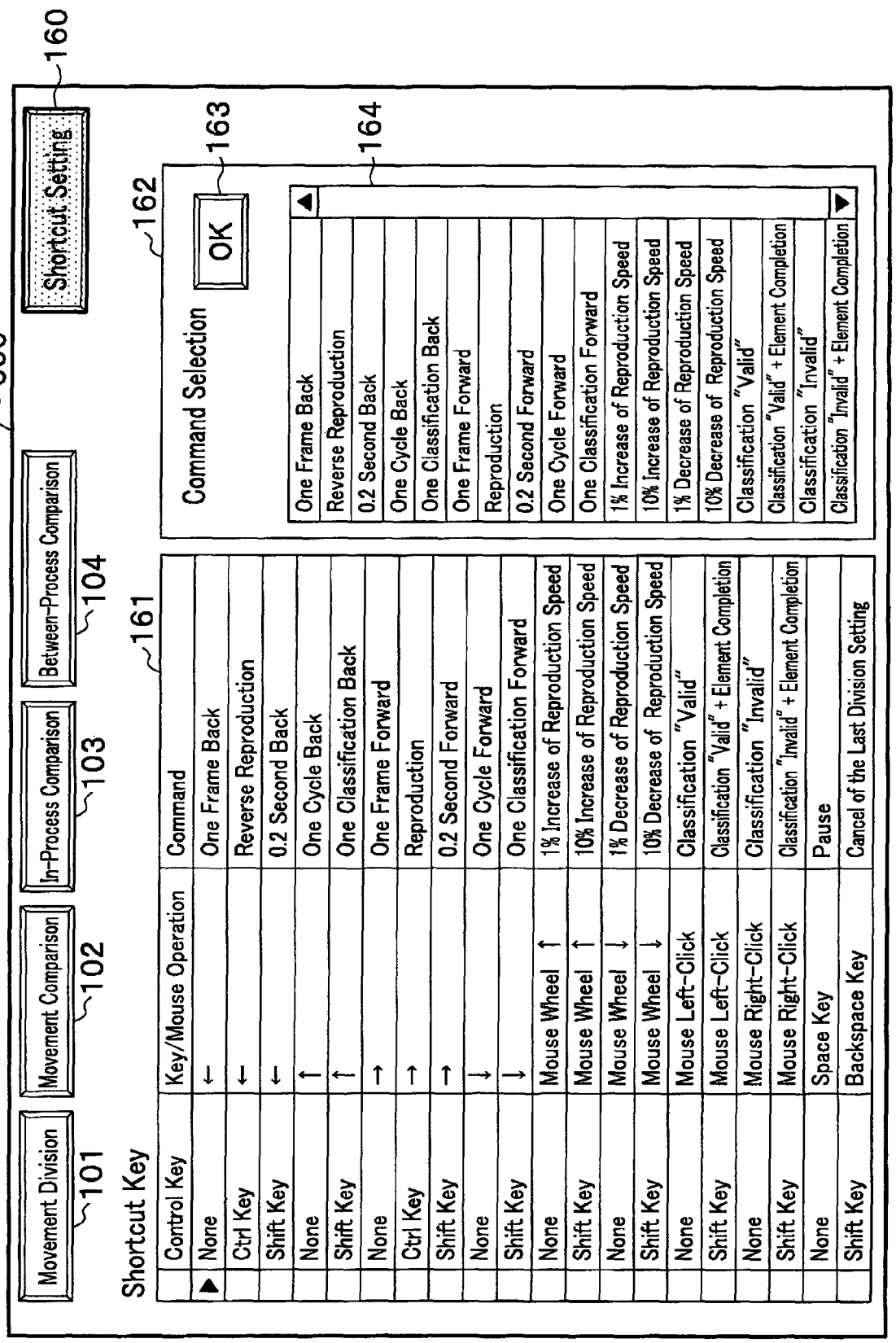

WORK MOVEMENT ANALYSIS METHOD, WORK MOVEMENT ANALYSIS APPARATUS, AND WORK MOVEMENT ANALYSIS PROGRAM

BACKGROUND OF THE INVENTION

1. Field of the Invention

The present invention relates to a work movement analysis method, a work movement analysis apparatus, and a work movement analysis program for analyzing a validity, skill level, and problem of a worker's movement in such a work process.

2. Description of the Related Art

At a job site where one or more workers perform a work such as a supply, process, assembly, and packaging of a part by manpower, it is necessary to optimize a work procedure, estimate a standard work time, and converge the work to the standard work time from a viewpoint of production control. In a non patent document "Work Study and Work Control" (Shoji Kawashima, first edition, p. 303 to 311, published by JAPAN MANAGEMENT ASSOCIATION, Apr. 30, 1979), as a method of estimating a time required for a work is shown using a rating coefficient as a rating of a work speed and converting it to a normal speed. A worker is different in work speed depending on such a skill level, age, and gender thereof. For example, in the method, with respect to a worker inferior in skill and slow in work speed, a standard work time is obtained by multiplying an actual work time by a rating coefficient.

A method of optimizing a work procedure and simulating a standard work time, in which an actual work is recorded as video data and then analyzed, is disclosed in Japanese Patent Laid-Open Publication No. H06-168246 and a non patent document "Computer Aided Construction Engineering System for Nuclear Power Plants" (corresponding to the Japanese Patent H06-168246) (Toshiaki Yoshinaga and other three persons, p. 27 to 38, No. 10, vol. 72, published by Hitachi Hyouron, Hitachi Hyouron Co., Oct., 1990). The video data is subdivided and grouped into smaller movement unit data, and a work speed is adjusted with respect to individual pieces of the grouped movement data, considering a work efficiency of individual workers; thereby, an image reproduction speed of a human movement is modified like a movement image of a standard worker. By appropriately combining these pieces of the movement data after adjustment based on a scenario of an optimized work procedure, it is possible to simulate by a moving picture a manner of a standard worker performing the specific work procedure.

By a production manager to an end worker sharing such a simulation result, it becomes possible to make them understand a work speed and a work procedure based on an optimized scenario and for the manager to train workers.

In the Japanese Patent H06-168246 and the non patent document "Computer Aided Construction Engineering System for Nuclear Power Plants," because a work object is a plant before installation and the work is simulated based on information of a three-dimensional CAD (Computer Aided Design) of the plant, movement data of a worker is sampled at a certain time interval and made into an animation. On the other hand, in Japanese Patent Laid-Open Publication No. H06-231137 is disclosed a technology in which a series of work videos is divided at a transition of a certain work in a real video. This provides an area for displaying a video image and an area for displaying a button for specifying a work kind, gives a name of the work kind by clicking the button by mouse, and divides the video. Although this technology uses video data of a video tape itself, it has become possible to easily divide and edit the video data as MPEG (Moving Picture Expert Group) on a personal computer without relying on the video tape thanks to a highly-developed computer, a large capacity of a hard disk, and a pervasion of an image compression technology in recent years.

In a case of reproducing a real video as a video tape or MPEG data, an operator analyzing a work has to face a movement ever-changing before her/his eyes, being different from the sampling in the case of the Japanese Patent H06-168246.

In the Japanese Patent H06-231137, watching a video image, selecting a work item name at a time T1, continuing reproducing the image, selecting the work item name by clicking the image one after another at a transition of the work, and defining a work image reproduced hereafter, the work image is divided. Accordingly, a time T required for a work of a certain work item name is obtained by T2-T1 if a next work item name is selected at a time T2.

However, although in the operation an analysis operator of a work has to input information for identifying the work with respect to a worker's movement inspected hereafter, it is necessary to partly rewind and inspect the movement in a case of the worker's movement being different, contrary to an expectation of the operator. In order to evade such a thing, it is necessary to once look through a video image, to have understood a worker's behavior, and then to start the analysis.

SUMMARY OF THE INVENTION

In view of the problems of the conventional technologies thus described, there is a need for a work movement analysis method, a work movement analysis apparatus, and a work movement analysis program that can efficiently analyze moving picture information of a work movement in such a case of a same worker repeating a same movement many times; that can statistically process numerical data acquired by the analysis and utilize the numerical data statistically processed; and that can realize a comfortable operationality for an analysis operator of the work movement.

In a work movement analysis method for causing a processing unit having a display unit and a storage unit perform a work movement division processing in order to divide a worker's work movement acquired as a moving picture into a plurality of movement sections, the method comprises the steps of: displaying a plurality of movement section classification buttons, where identification information for respectively identifying a plurality of kinds of movement sections are individually allocated, in the display unit; reproducing the acquired moving picture in the display unit; allocating movement section identification information defined by a specific movement section classification button to a moving picture of a work reproduced by just before a selection of the movement section classification button in a case of the movement section classification button being selected by an operator who has inspected the reproduced moving picture; storing a position of a moving picture displayed in a case of the specific movement section classification button being selected, as an end position of a movement section where the movement section identification information is allocated; defining an end position of a previous movement section stored in the storage unit as a start position of a current movement section, and in a case of the end position of the previous movement section not existing, defining a reproduction start position of a moving picture of the work movement as the start position of the current movement section; and dividing the work movement into the movement sections.

Here, a work movement means a worker's movement of a series of processes performed through manpower by any of individual workers and a group of workers, and includes a cell and stable system of a production job site and a movement in a division work subdivided as in a conveyor line. Furthermore, a work movement element means, for example, respective movements of a unit configuring the work movement element such as "taking out a material to be fixed with a screw," "fasten a screw," and "affixing a label seal." Furthermore, a movement section means a movement portion (part) where a work movement is further subsectioned into such a valid movement and an invalid movement, depending on a movement state of the movement part, and in a wider meaning, means a movement of which a name is fixedly definable in advance in performing an analysis.

In accordance with the present invention, because an analysis operator of a work can input information for identifying a movement section of a worker's movement inspected then and there, there can hardly occur such a situation that it is requested to partly retrace and reproduce a moving picture because of a worker's behavior unexpected by the analysis operator, which the behavior is a conventional problem. Accordingly, it is possible to omit a labor hour of once looking through a movement, where a work is recorded, and checking a worker's behavior in advance before starting the analysis of the movement.

BRIEF DESCRIPTION OF THE DRAWINGS

FIG. 4 is a drawing showing an example of a record configuration of work movement division information stored in a work movement division information storage unit as a project file in the work movement analysis apparatus of the embodiment.

FIG. 5 is a drawing showing an example of a configuration of work movement analysis information stored in a work movement analysis information storage unit in the work movement analysis apparatus of the embodiment.

FIG. 13 is a drawing showing an example of a display screen displayed by a shortcut key setting processing unit in the work movement analysis apparatus of the embodiment.

BEST MODE FOR CARRYING OUT THE INVENTION

Here will be described an embodiment of the present invention in detail, referring to drawings as needed.

<Configuration of Work Movement Analysis Apparatus>

Figure 1:
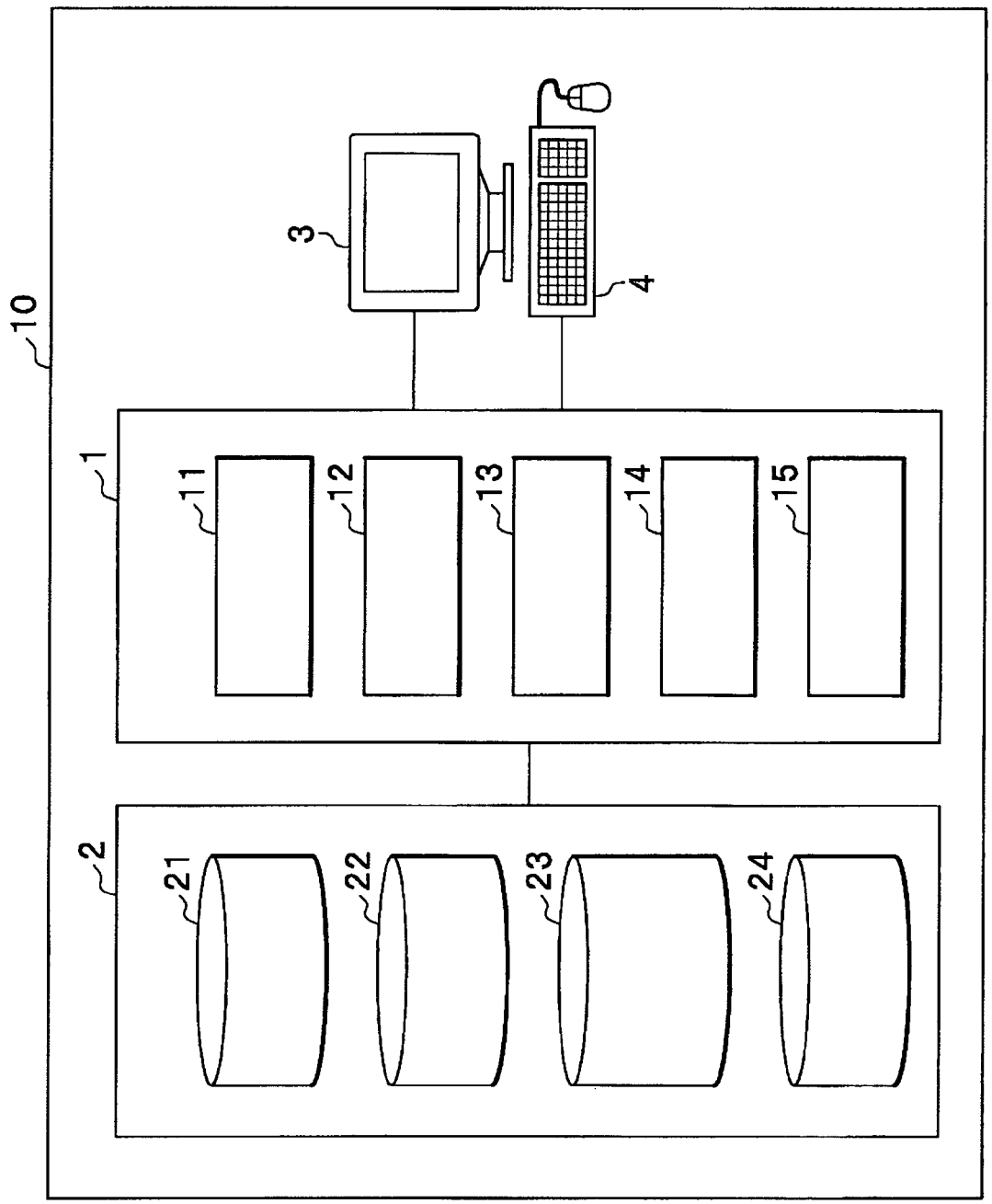
FIG. 1 is a drawing showing an example of a configuration of a work movement analysis apparatus with respect to an embodiment of the present invention.

As shown in FIG. 1, a work movement analysis apparatus 10 comprises a processing unit 1, a storage unit 2, a display unit 3, and an operation input unit 4.

Here, the processing unit 1 comprises a CPU (Central Processing Unit, not shown) for executing a program, and a RAM (Random Access Memory, not shown) of a semiconductor for temporary storing such the program in execution and information accompanied with the execution of the program. Then in a case of the embodiment, the processing unit 1 is configured with function processing blocks such as a work movement division processing unit 11, a work movement comparison display processing unit 12, an in-process comparison work movement processing unit 13, a between-process comparison work movement processing unit 14, and a shortcut key setting processing unit 15. In addition, functions of the function processing blocks are realized by the CPU executing a predetermined program stored in such the RAM.

Furthermore, the storage unit 2 is normally configured with an involatile memory device such as a hard disk drive (not shown), and stores a program in non-execution; information requested when the processing unit 1 executes a predetermined program; and information generated by the unit 1 executing the predetermined program. In the case of the present invention the storage unit 2 comprises a work movement moving picture storage unit 21, a work movement division information storage unit 22, a work movement analysis information storage unit 23, and a shortcut key setting information storage unit 24. A configuration of information stored in each of the storage units will be described later.

Furthermore, the display unit 3 is configured with such an LCD (Liquid Crystal Display), is used for reproducing a movement moving picture of a worker's work movement taken by such a video camera in advance, and displays various pieces of information generated by the processing unit 1 as needed. Furthermore, the operation input unit 4 is configured with such a keyboard and a mouse, and is used for an operator (hereinafter referred to as analysis operator), who analyzes a work movement moving picture reproduced in the display unit 3, inputting requested information.

<Basic Function of Work Movement Division Processing Unit>

Hereafter referring to FIGS. 2 to 5, a basic function of the work movement division processing unit 11 will be described.

Figure 2:
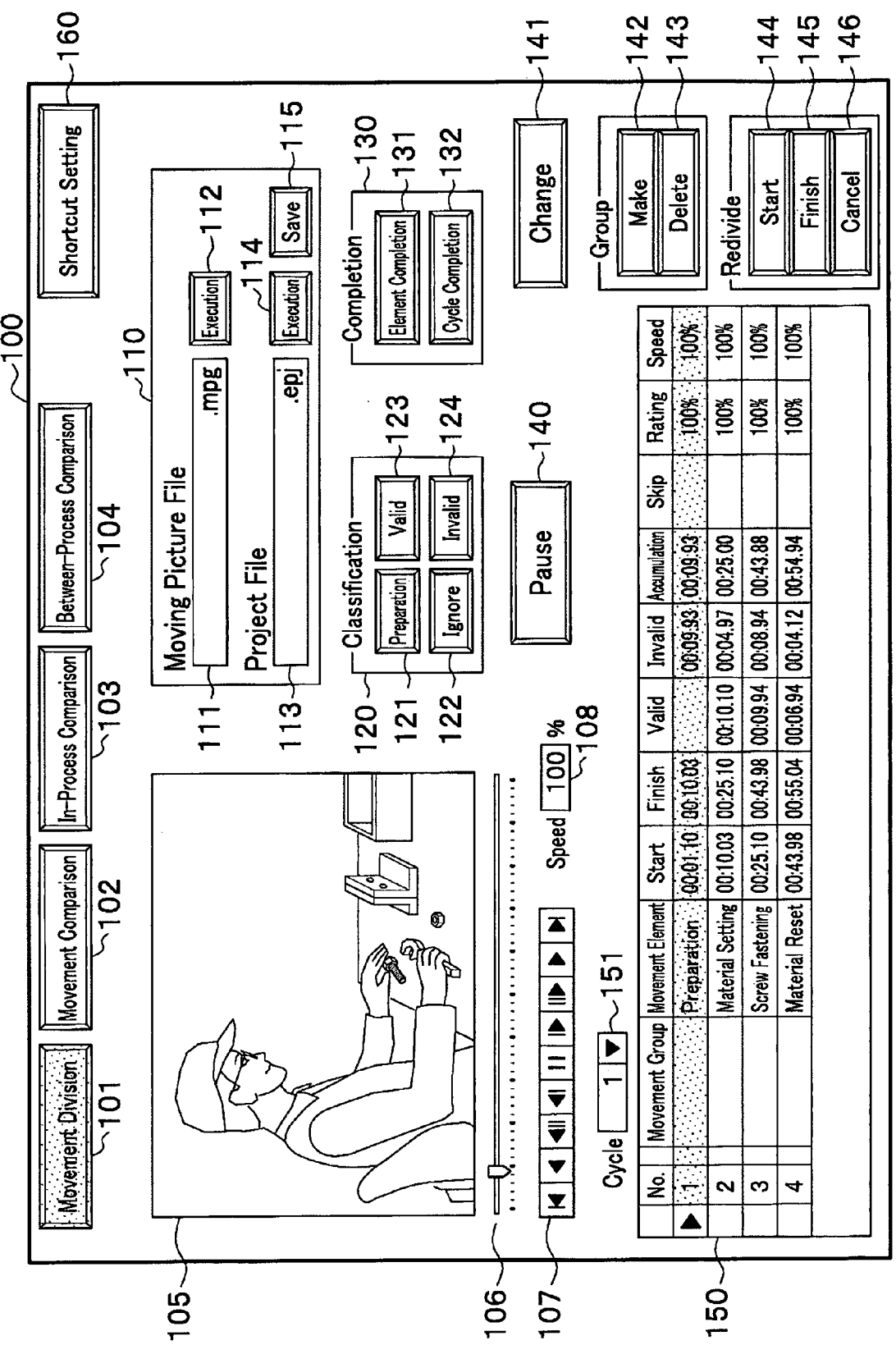
FIG. 2 is a drawing showing an example of a display screen displayed by a work movement division processing unit in the work movement analysis apparatus of the embodiment.

Firstly, if a power source of the work movement analysis apparatus 10 is switched on and the apparatus 10 is initialized, the CPU of the processing unit 1 (hereinafter simply referred to as the processing unit 1) displays as an initial display screen, for example, a display screen 100 as shown in FIG. 2. However, at this timing, in a part of a display area (such a moving picture display area 105 and a work movement analysis information display area 150), only its outer frame is displayed and a content thereof is not displayed.

A movement division button 101, a movement comparison button 102, a in-process comparison button 103, a between-process comparison button 104, and a shortcut setting button 160 shown in FIG. 2 are respectively associated with processing activations of the work movement division processing unit 11, the work movement comparison display processing unit 12, the in-process comparison work movement processing unit 13, the between-process comparison work movement processing unit 14, and the shortcut key setting processing unit 15 configuring the processing unit 1 in FIG. 1.

Furthermore, in the display screen 100 is displayed a file setting dialogue box 110; in the box 110 are provided an input box 111 for inputting a name of a moving picture file, an execution button 112 for opening the moving picture file, an input box 113 for inputting a name of a project file, an execution button 114 for opening the project file, and a save button 115 for saving the project file.

Here, a moving picture file is a file where a worker's work movement of a process is recorded through a moving picture taken by such a video camera, and for example, is configured with data having a format such as MPEG. In addition, in one moving picture file is normally recorded a manner of one or more workers repeating a work movement of a process by a plurality of times. The moving picture file is stored in the work movement moving picture storage unit 21 of the work movement analysis apparatus 10.

Furthermore, with respect to a worker's work movement recorded in the moving picture file, a project file is a file for dividing the work movement into a work movement and a movement section by the work movement analysis apparatus 10 and for storing division information of the divided work movement. Accordingly, with the project file is associated at least one moving picture file of a division object of a work movement. In addition, a project file is stored in the RAM comprised in the processing unit 1 when the file is made; whereas the file is saved in the work movement division information storage unit 22 of the storage unit 2 configured with such a hard disk drive if the save button 115 is clicked after a name of the file is input in the input box 113.

Consequently, when performing a movement analysis of a worker's work movement moving picture, an analysis operator inputs a name of a moving picture file, where the work movement is recorded, and clicks the execution button 112. If so, in the moving picture display area 105 is displayed a moving picture recorded in the moving picture file with the name.

Next, if the analysis operator clicks a reproduction start button (rightward black triangle button) of a moving picture control button 107, the processing unit 1 starts reproducing the moving picture of a moving picture file designated by the input box 111. At this time a reproduction speed of the moving picture can be set by the analysis operator appropriately inputting a numeric of the speed in a reproduction speed setting input box 108. At this time a configuration of the moving picture control button 107 is similar to that displayed by a normal moving picture display program; for example, there are a stop button where two bars are longitudinally given and a reproduction control button where a black triangle is given. In addition, the reproduction control button indicates any one of forward and reverse directions in reproduction according to a direction of the black triangle; with respect to any one direction is provided a button for controlling a continuous reproduction, one frame forward, 0.2-second forward, and one cycle forward.

Next, if the processing unit 1 starts reproducing the moving picture of a work movement in the moving picture display area 105 of the display screen 100, the analysis operator divides the work movement into a work movement and a movement section while inspecting the moving picture of the work movement. In dividing the work movement the analysis operator mainly uses a classification button 120 and a completion button 130.

Here, in the display screen 100 are provided a preparation button 121, an ignore button 122, a valid button 123, an invalid button 124 as the classification button 120. The preparation button 121 is a button for indicating that a movement until just before the button being clicked is a preparation movement in performing a work movement of a process. Furthermore, the ignore button 122 is a button for indicating that a movement until just before the button being clicked is a movement unrelated to the work movement of the process. Furthermore, the valid button 123 is a button for indicating that a movement until just before the button being clicked is a movement determined to be a valid movement in light of a purpose of a work movement. Furthermore, the invalid button 124 is a button for indicating that a movement until just before the button being clicked is a movement determined to be an invalid movement in light of the purpose of the work movement element.

Furthermore, in the display screen 100 are provided an element completion button 131 and a cycle completion button 132 as the completion button 130. The element completion button 131 is clicked after the classification button 120 is clicked once or more, and thereby, indicates that one work movement element is completed. Furthermore, the cycle completion button 132 is clicked after the element completion button 131 is clicked once or more, and thereby, indicates that one-time work movement in a process is completed. In addition, in the specification, one-time work movement of a work movement repeated in a process is called one cycle work movement.

Figure 3:
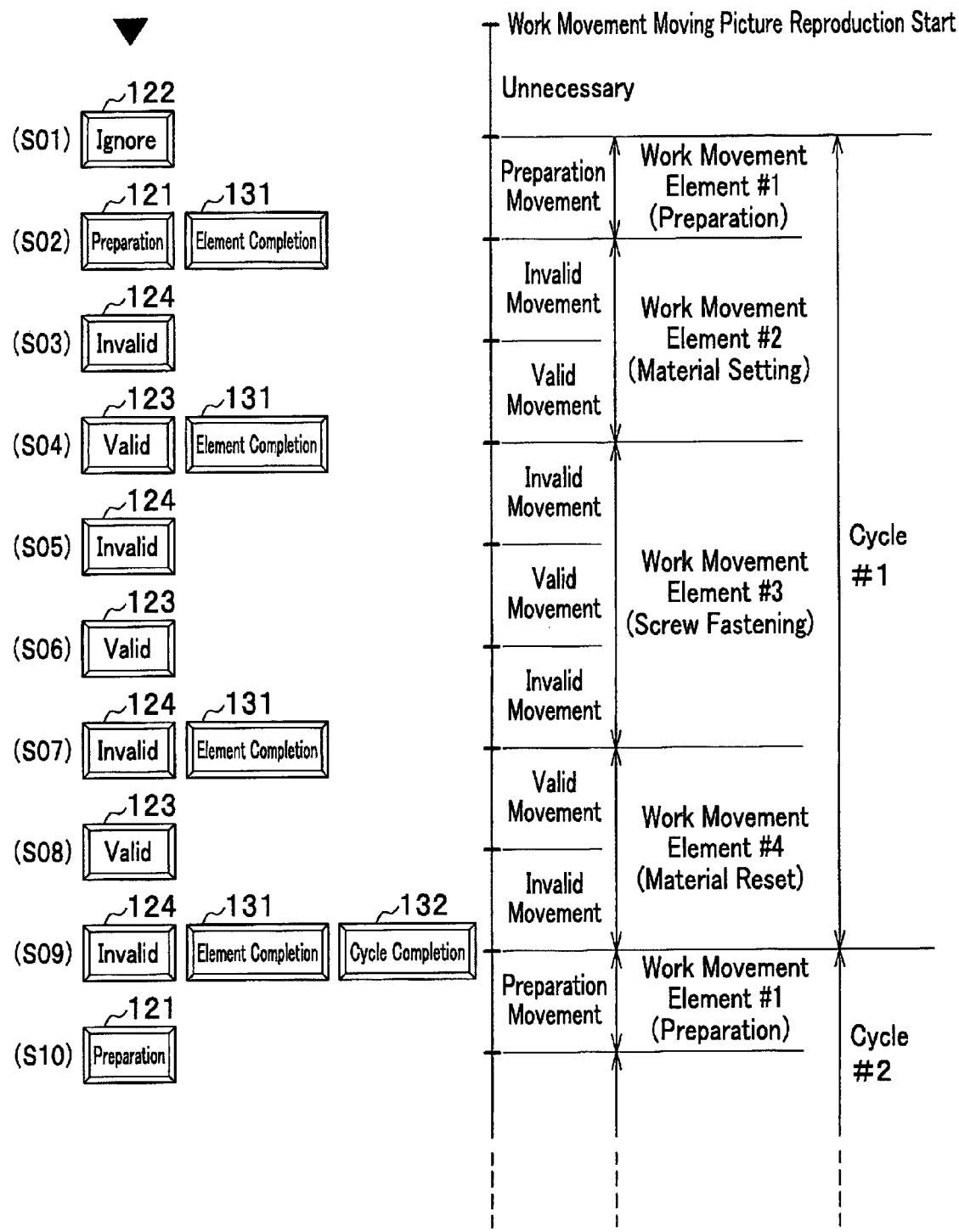
FIG. 3 is a drawing showing an example of an operation procedure at a time when dividing a work movement into work movement elements and further into movement sections in the work movement analysis apparatus of the embodiment.

As shown in FIG. 3, while inspecting a work movement moving picture displayed in the moving picture display area 105, an analysis operator divides a work movement into a work movement and a movement section, for example, by clicking the classification button 120 and the completion button 130 in order shown in FIG. 3.

In FIG. 3, in a case of a moving picture (for example, such a connection part in editing the moving picture) unrelated to a work movement of a current process being included in a first part of the work movement moving picture when the reproduction of the work movement moving picture is started, an analysis operator clicks the ignore button 122 at a timing of a moving picture part unrelated to the work movement of the process being finished (step S01). In that case the processing unit 1 regards the moving picture part of the work movement divided by the ignore button 122 as an unnecessary part, and in a subsequent processing, handles the ignored part as not being included in the work movement of the process.

Next, the analysis operator clicks the preparation button 121 at a timing of a worker having finished a preparation movement for performing the work movement of the process in the work movement moving picture, and subsequently clicks the element completion button 131 (step S02). In that case the processing unit 1 makes a worker's work movement part from a timing of the ignore button 122 being previously clicked to that of the preparation button 121 being clicked this time to be a movement section of "preparation movement,"

and in conjunction therewith, makes a work movement of the part a first work movement element (work movement element #1) called "preparation."

Next, when determining a worker's work movement subsequent to the preparation movement to be an invalid movement, the analysis operator clicks the invalid button 124 at a timing of the invalid movement being finished (step S03). Next, at a timing of the invalid movement having changed to a valid movement, the analysis operator clicks the valid button 123, and subsequently clicks the element completion button 131 (step S04). In this case the processing unit 1 makes a work movement part from a timing of the preparation button 121 being previously clicked to that of the ignore button 124 being clicked this time to be a movement section of "invalid movement," and furthermore, makes a work movement moving picture part from a timing of the ignore button 124 being clicked to that of the valid button 123 being clicked to be a movement section of "valid movement." Then in conjunction of these "invalid movement" and "valid movement" is made a second work movement element (work movement element #2). Then to the work movement element #2 is given a name (identification information) of, for example, "material set." However, the analysis operator can anytime perform an input operation of giving a name of the work movement element #2 if before clicking the cycle completion button 132 (in addition, a timing of being able to perform an input operation of a name of a similar work movement element is hereafter the same).

Moreover, the analysis operator performs a similar operation for subsequent work movement moving picture parts (steps S05, S06, S07). In that case the processing unit 1 similarly makes the subsequent parts of the work movement moving picture to be the movement sections of "invalid movement," "valid movement," and "invalid movement," makes a third work movement element (work movement element #3) in conjunction of the movement sections of "invalid movement," "valid movement," and "invalid movement," and gives, for example, a name of "screw fastening" to the work movement element #3.

Furthermore, the analysis operator performs a similar operation with respect to subsequent work movement moving picture parts (steps S08, S09). In that case the processing unit 1 similarly makes the subsequent parts of the work movement moving picture to be the movement sections of "valid movement" and "invalid movement," makes a fourth work movement element (work movement element #4) in conjunction of the movement sections of those "valid movement" and "invalid movement," and gives, for example, a name of "material reset" to the work movement element #4.

Then, when a work movement (one cycle work movement) of a process consisting of a series of work movement elements is finished in a worker's work movement moving picture reproduced on the display screen 100, an analysis operator clicks the cycle completion button 132. In that case the processing unit 1 recognizes that one cycle work movement of a predetermined process is completed, and increases a cycle sequence number by one given to such work movement division information of a project file; and furthermore, at that time the processing unit 1 deletes displays of start and end time position information, valid and invalid count time information, and accumulation time information in the work movement element analysis information display area 150.

Then, because a work movement reproduced in the display screen 100 becomes a second cycle work movement, the analysis operator clicks the preparation button 121 (step S10), depending on the work movement, and clicks the classification button 120 and the completion button 130 from the steps S02 to S10 according to a procedure approximately similar to the case of the first cycle work movement.

In addition, in the procedure shown in FIG. 3, although a pause button 140 for temporarily stopping reproducing a work movement moving picture is configured not to be used, the button 140 may be configured to be used. In that case the analysis operator clicks the pause button 140 and can click the classification button 120 and the completion button 130 well in advance while the reproduction of the work movement moving picture is stopped.

As shown in FIG. 4, a record of work movement division information comprises a cycle sequence number, a movement group number, a movement group name, a movement element sequence number, a movement element name, a movement section identification (movement section name), a movement start time position, a movement end time position, a reproduction speed, reproduction skip information, and rating information.

The processing unit 1 generates one record (one-row data) of the work movement division information when the classification button 120 (see FIG. 2) is clicked. In other words, when any one of the classification button 120 is clicked, the processing unit 1 acquires the position information of a work movement moving picture displayed in the moving picture display area 105 as the information of a reproduction elapse time from a time when the work movement moving picture is started to be reproduced. Then the processing unit 1 makes the acquired position information division the position information of a movement section, that is, a movement end time position. Furthermore, the processing unit 1 gives any one of an identification and name of the movement section as information for identifying the movement section at that time, depending on the classification button 120 clicked, that is, the preparation button 121, the ignore button 122, the valid button 123, and the invalid button 124. In addition, a movement start time position is the division position information of a movement section acquired in a previous click of the classification button 120.

In FIG. 4 the cycle sequence number is a sequence number given to a work movement of a worker's work movement recorded in a current moving picture file. Furthermore, the movement element sequence number is a sequence number given to a work movement configuring each work movement cycle; the work movement element name is a name (identification information also available) given to the work movement element. Furthermore, the movement section identification (movement section name) is information for identifying a movement section. Furthermore, the movement start time position and the movement end time position are as described before. In addition, descriptions of the movement group number, the movement group name, the reproduction speed, the reproduction skip information, and the rating information will be described later.

As shown in FIG. 5, a record of work movement element analysis information comprises the cycle sequence number, the movement group number, the movement group name, the movement element sequence number, the movement element name, the movement start time position, the movement end time position, the reproduction speed, the reproduction skip information, and the rating information. The processing unit 1 generates one record (one-row data) of the work movement element analysis information when the element completion button 131 is clicked.

In FIG. 5 most part of information configuring the record of the work movement element analysis information is the same as the information configuring that of the work movement division information. A difference is that there exists no information related to the movement section and that instead there exist the valid time, the invalid time, and the accumulation time. This is due to one record of the work movement division information being generated when the classification button 120 is clicked and that one record of the work movement element analysis information being generated when the element completion button 131 is clicked. In other words, the work movement element analysis information is information included in a movement section configuring a current work movement element, that is, information where the work movement division information is compiled. In this connection, the valid time of the work movement analysis information is a time when a movement time of a movement divided into a valid movement out of movement sections configuring the current work movement element; the invalid time is a time when a movement time of a movement divided into invalid movements is compiled. Furthermore, the accumulation time is a time when the valid time and invalid time of each movement element are accumulated in the current cycle.

The processing unit 1 displays the Work movement analysis information thus described in the work movement analysis information display area 150 of the display screen 100 every time when one record of the analysis information is generated. Then in a column of "No." of the work movement analysis information is displayed a movement element sequence number; in a cycle information input box 151 is displayed a cycle sequence number.

Subsequently, inputting information using the work movement analysis information display area 150 will be described. Only if an analysis operator clicks the element completion button 131 in analyzing a work movement of a first cycle, none is displayed in a column of "Movement Element Name" of the work movement analysis information displayed in the work movement analysis information display area 150. It is because at this timing a work movement name is not input. Consequently, in the work movement analysis apparatus 10 of the embodiment, the column of "Movement Element Name" of the work movement analysis information display area 150 is designed to be able to be used as an input box for inputting a work movement name. In other words, an analysis operator can input a work movement name from the column of "Movement Element Name" of the work movement analysis information display area 150.

A timing when an analysis operator inputs a work movement name in the column of "Movement Element Name" of the work movement analysis information display area 150 may be anytime, if the timing is after the element completion button 131 for dividing a work movement into work movement elements is clicked and before the cycle completion button 132 is clicked. In other words, an analysis operator may input a work movement name, for example, every time after clicking the element completion button 131 or may also input in one lump the element name included in the cycle by a time when she/he clicks the cycle completion button 132. In addition, when an analysis operator inputs a work movement name, she/he clicks the pause button 140 and temporarily stops the work movement moving picture in reproduction in order to prevent an intervention with any input by other buttons and keys.

Thus in the case of an analysis operator having finished inputting a work movement name with respect to a work movement of a first cycle by a time when she/he clicks the cycle completion button 132, the processing unit 1 displays the element name in the column of "Movement Element Name" of the work movement analysis information display area 150 according to the same sequence as in the movement element sequence of the first cycle in displaying work movement analysis information in the area 150 after a second cycle.

Thus because the analysis operator need not input the work movement analysis name after the second cycle, it is possible to reduce the load of her/his operation.

In addition, although it may be thought that a sequence of work movement elements is almost same in a case of a same worker repeating a work movement of a same process, she/he haphazardly makes a mistake in the sequence or changes it on purpose in some case. For that case in the display screen 100 of the work movement analysis apparatus 10 is provided a change button 141. In other words, if an analysis operator clicks the change button 141 after selecting sequential fields of two movement element names out of work movement analysis information displayed in the work movement analysis information display area 150, the two movement element names are changed to each other.

Thus in the work movement analysis information, if a work movement name is set with respect to each work movement element, the work movement analysis apparatus 10 also sets the work movement element name in each record of the work movement division information in conjunction therewith.

Then not depending on whether or not the reproduction of a work movement moving picture of a moving picture file name designated in the input box 111 being finished, if an analysis operator clicks the save button 115 of a project file, the processing unit 1 generates the project file, including the work movement division information thus generated and the name of the moving picture file then used, and saves the project file in the work movement division information storage unit 22. At this time the analysis operator inputs the name of the project file from the input box 113.

In addition, because the work movement analysis information in FIG. 5 can be easily generated from the work movement division information saved as the project file, it is not necessary to save the analysis information. Accordingly, the work movement analysis information storage unit 23 may also be configured on a semiconductor memory such as a RAM, not an involatile storage such as a hard disk drive.

<Detailed Configuration and Function of Work Movement Division Processing Unit>

Thus a basic function of the work movement division processing unit 11 of the work movement analysis apparatus 10 has been described; then a detailed configuration and function of the processing unit 11 will be described, referring to FIGS. 6 to 8.

Figure 6:
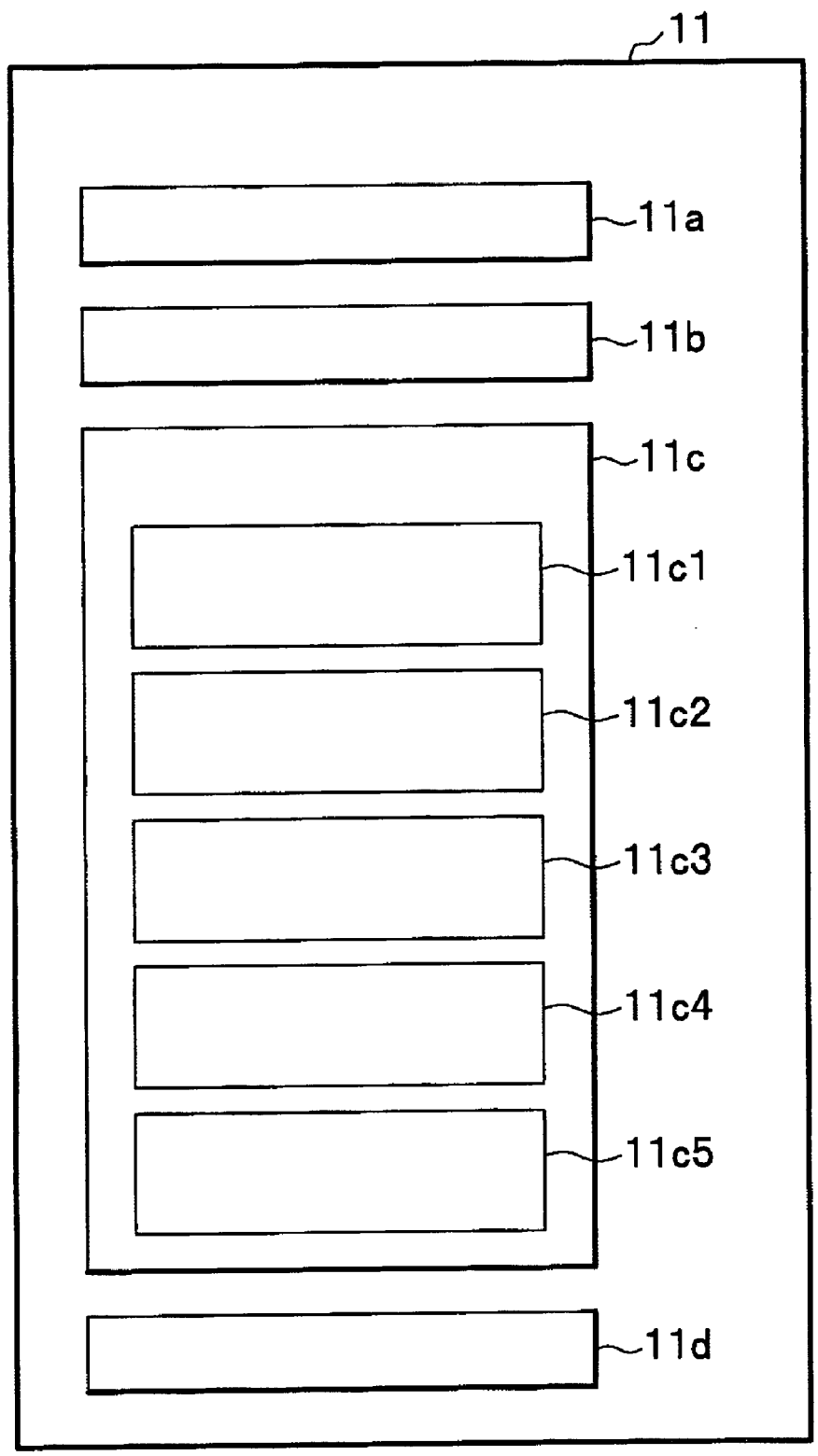
FIG. 6 is a drawing showing an example of a detailed configuration of a work movement division processing unit in the work movement analysis apparatus of the embodiment.

FIG. 6 is a drawing showing an example of the detailed configuration of the work movement division processing unit 11 in the work movement analysis apparatus 10 of the embodiment. As shown in FIG. 6, the work movement division processing unit 11 comprises a work movement moving picture reproduction processing unit 11a, a work movement division information generation processing unit 11b, a work movement division information edit processing unit 11c, and a work movement redivision processing unit 11d. The work movement division information edit processing unit 11c further comprises a work movement change processing unit 11c1, a work movement grouping processing unit 11c2, a work movement rating setting processing unit 11c3, a work movement reproduction speed setting processing unit 11c4, and a work movement reproduction skip setting processing unit 11c5.

In addition, functions of these functional blocks correspond to a function of the work movement division processing unit 11, and are realized by the CPU of the processing unit 1 (see FIG. 1) of the work movement analysis apparatus 10 executing a predetermined program stored in such a RAM.

(Work Movement Moving Picture Reproduction Processing Unit)

A basic function of the work movement moving picture reproduction processing unit 11a is to reproduce a moving picture file designated by a moving picture file name set in the input box 111 of the display screen 100 (see FIG. 2). In other words, the processing unit 1 controls the reproduction of the designated moving picture according to information input through the moving picture control button 107 and the pause button 140, and a reproduction speed set in the reproduction speed setting input box 108.

Furthermore, the processing unit 1 controls the reproduction of a moving picture file, also according to such a reproduction speed, reproduction skip information, and rating information for every work movement element or every movement section stored in the work movement division information (see FIG. 4) of a project file. In this case, when reproducing a work movement moving picture recorded in a moving picture file, the processing unit 1 always monitors a reproduction time position with respect to the reproduced work movement moving picture; refers to the work movement division information every time when the time position reaches the movement start time position of each movement section of the division information; and controls the reproduction of the moving picture according to a reproduction speed, reproduction skip information, and rating information with respect to the movement section.

In addition, in FIG. 4, although standard values are input in the columns of the reproduction speed, the reproduction skip information, and the rating information, it is possible to appropriately change the values according to a procedure described later. In addition, with respect to these standard values, in a case of the reproduction speed and the rating information, a ratio of the reproduction speed to a normal reproduction speed is "1" (100% speed of the normal reproduction speed); in a case of the reproduction skip information, the ratio is "0" that means not skipping the reproduction.

Furthermore, in a case of a cycle sequence number being set in the cycle information input box 151 (see FIG. 2), the processing unit 1 reproduces a work movement moving picture of a work movement cycle designated by the number.

(Work Movement Division Information Generation Processing Unit)

A basic function of the work movement division information generation processing unit 11b is to divide a worker's work movement into a work movement and a movement section, based on information input by an analysis operator who has inspected a work movement moving picture of the worker recorded in a moving picture file designated in the input box 111. In this case a procedure of an analysis operator's operation and a movement of the work movement analysis apparatus 10 are as described, referring to FIGS. 2 to 5. Consequently, here will be only described a processing at a time when the classification button 120 and the completion button 130 in the work movement division information generation processing unit 11b are clicked.

Figure 7:
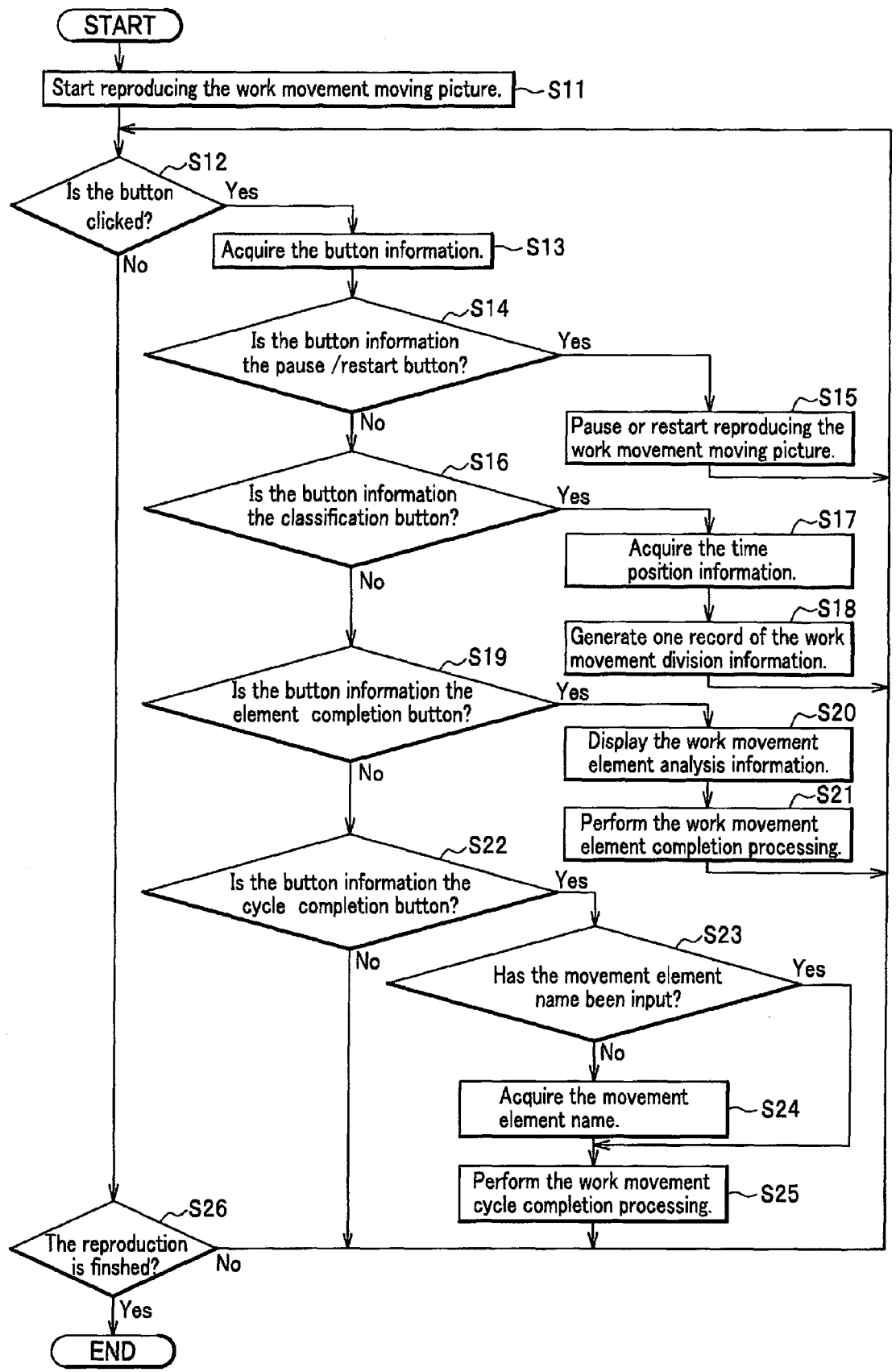
FIG. 7 is a flowchart showing an example of a processing flow of a work movement division processing unit when a classification button and a completion button are clicked in the work movement analysis apparatus of the embodiment.

FIG. 7 is a flowchart showing a processing flow of the work movement division information generation processing unit 11b at a time when the classification button 120 and the completion button 130 are clicked.

As shown in FIG. 7, the processing of the work movement division information generation processing unit 11b is started by an analysis operator's clicking the reproduction start button of the moving picture control button 107. In other words, when receiving the input of the reproduction start button, the processing unit 1 starts reproducing a work movement moving picture designated in the input box of a moving picture file name (step S11). Then the processing unit 1 waits for a button for dividing the work movement being clicked in the work movement moving picture to be reproduced (step S12). Here, a button for dividing a work movement means the classification button 120, the completion button 130, and the pause button 140.

Consequently, when the button for dividing a work movement of a work movement moving picture is clicked (Yes in the step S12), the processing unit 1 acquires information indicating what the clicked button is (step S13) and performs a predetermined processing according to the button information.

Consequently, when the button information indicates the pause button 140 (Yes in a step S14), the processing unit 1 temporarily stops reproducing the work movement moving picture (step S15). Or when the button information is information indicating a restart button (Yes in the step S14), the processing unit 1 restarts reproducing the work movement moving picture paused (step S15). Here, the restart button is the pause button 140 at a time when the reproduction of a work movement moving picture is temporarily stopped. In other words, the pause button 140 is configured to be a toggle switch, and a function of temporarily stopping reproducing a moving picture and that of restarting the reproduction are alternated for every click. In addition, in a case of a space key being associated with the pause button 140 (pause/restart button) as a shortcut key described later, an analysis operator can use the space key as the button having the toggle function of the pause and the restart.

Furthermore, when the button information indicates the classification button 120 (Yes in a step S16), the processing unit 1 acquires the time position information of a work movement moving picture in reproduction at that time (step S17), and generates one record of the work movement division information (see FIG. 4) according to the button 120 (step S18). At this time, which one of the preparation button 121, the ignore button 122, the valid button 123, and the invalid button 124 is clicked out of the classification button 120 is stored as the movement section identification information of the work movement division information, and the time position information acquired in the step S17 is stored as the movement end time position information.

Furthermore, when the button information indicates the element completion button 131 (Yes in a step S19), the processing unit 1 generates work movement analysis information (see FIG. 5) with respect to the work movement element, displays the generated work movement analysis information in the work movement analysis information display area 150 (step S20), and subsequently, performs a work movement completion processing (step S21). In addition, in the work movement element completion processing are increased the movement element sequence numbers (same number) by one, respectively, in the work movement division information and the work movement analysis information.

Furthermore, when the button information indicates the cycle completion button 132 (Yes in a step S22), the processing unit 1 determines whether or not the work movement element name of the work movement analysis information displayed in the work movement analysis information display area 150 has been already input (step S23). As a result thereof, the work movement element name has not yet been input (No in the step S23), the processing unit 1 acquires a movement element name input by an analysis operator (step S24), and sets the name in the column of the movement element name of the work movement analysis information. Furthermore, when the movement element name is already input (Yes in the step S23), the processing unit 1 skips the step S24. Subsequently, the processing unit 1 performs the work movement completion processing (step S25). In the work movement completion processing, the movement element sequence numbers are initialized in the work movement division information and the work movement analysis information and the cycle sequence numbers (same number) are increased therein by one, respectively.

Furthermore, after performing the steps S15, S18, S21, and S25 or when the button information is not information indicating any one of the button information thus described (No in all of the steps S15, S18, S21, and S25), the processing returns to the step S12 and the processing unit 1 waits for a button being clicked next time. When the reproduction of the work movement moving picture is finished (Yes in a step S26) before the button is not clicked (No in the step S12), the processing unit 1 finishes the processing of the work movement division information generation processing unit 11b.

(Work Movement Division Information Edit Processing Unit)

Next will be described respective processings of the work movement element change processing unit 11c1, the work movement element grouping processing unit 11c2, the work movement element rating setting processing unit 11c3, the work movement element reproduction speed setting processing unit 11c4, and the work movement element reproduction skip setting processing unit 11c5 included in the work movement division information edit processing unit 11c.

The work movement element change processing unit 11c1 is a processing, as described before, performed by the processing unit 1 when an analysis operator selects two work movement element names in the work movement analysis information displayed in the work movement analysis information display area 150 (see FIG. 2) and clicks the change button 141.

In other words, the processing unit 1 changes selected two work movement element names within work movement analysis information with respect to relevant work movement analysis information of a designated cycle in the cycle information input box 151, that is, with respect to work movement analysis information of a cycle displayed at that time. Furthermore, two work movement element names are also changed with respect to work movement analysis information displayed in the work movement analysis information display area 150.

The processing of the work movement element grouping processing unit 11c2 is a processing performed by the processing unit 1 when an analysis operator selects certain sequential two or more work movement element names and clicks a group make-button 142 and when she/he selects a work movement name and clicks a group delete-button 143 with respect to work movement analysis information displayed in the work movement analysis information display area 150.

In other words, when the group make-button group make-button 142 is clicked, the processing unit 1 collects work movement elements in same rows as the selected two or more work movement element names into one group. Here, collecting into one group means giving a same number to a movement group number of a row corresponding to relevant work movement analysis information. Then receiving the input into the movement group name column of the corresponding row, the processing unit 1 sets a movement group name.

Thus when a plurality of work movement elements are collected into one, it is possible to use the movement group name of the elements as the movement element name of the elements. In this case in displaying work movement analysis information, it may also be configured not to display rows of a plurality of work movement elements grouped but alternatively to collect and display the information into one row (the movement group name is input in the column of the work movement element of this case).

Furthermore, when the group delete-button 143 is clicked, the processing unit 1 deletes the movement group name and movement group number of the row where the selected movement name is given in relevant work movement analysis information.

The processing of the work movement element rating setting processing unit 11c3 is, for example, a processing at a time when an analysis operator inputs rating data in the column of the rating information and clicks, for example, an enter key in work movement analysis information displayed in the work movement analysis information display area 150.

In this case the processing unit 1 acquires the input rating data and updates the rating information of relevant work movement analysis information corresponding to a row (that is, the movement element name is same) included in the input rating information according to the acquired rating data. At this time an analysis operator may also select the column of the rating information for every row of the movement element in the work movement analysis information display area 150 and set individual values in respective fields of the column; furthermore, she/he may also select in one lump the column of the rating information of rows of all movement elements and set in one lump a same value in the column.

Here, rating information is a ratio of a worker's movement speed to average worker's movement speed of a work movement and is indicated, for example, in such %. In other words, when the rating information is 120%, the movement speed means faster than average one; when the rating information is 80%, the movement speed means slower than average one. Accordingly, rating data is usually set by such a work supervisor of a process.

In addition, when rating information is updated according to the processings thus described, in conjunction with the update, work movement analysis information corresponding to the updated data is also updated. Here, when rating information is set, a worker is assumed to work on the basis of a work time according to the rating information, and in order to simulate a manner of the work, a relevant work movement element part of a work movement moving picture is reproduced according to a reproduction speed depending on the rating speed of the moving picture. Accordingly, the valid time, the invalid time, and the accumulation time out of the work movement analysis information displayed in the work movement analysis information display area 150 are updated, depending on their rating information.

The processing of the work movement element reproduction speed setting processing unit 11c4 is almost the same as that of the work movement element rating setting processing unit 11c3 except that information of the processing object is different: the former, the reproduction speed and the latter, the rating information. However, because the reproduction speed is information only for controlling the reproduction speed of the relevant work movement element part of a work movement moving picture, the valid time, invalid time, and accumulation time of work movement analysis information displayed in the work movement analysis information display area 150 are not updated even if the reproduction speed is updated.

Furthermore, the processing of the work movement element reproduction skip setting processing unit 11c5 is also almost the same as that of the work movement element rating setting processing unit 11c3 except that information of the processing object is different: the former, the reproduction skip information and the latter, the rating information. In addition, in this processing, when "1" is set in the skip information of a work movement, reproducing the invalid movement of the element is skipped.

In accordance with the processings of the work movement division information edit processing unit 11c thus described, an analysis operator can edit any piece of work movement division information and work movement analysis information through a simple operation, even while inspecting the work movement moving picture and while working an operation of dividing a work movement on the work movement moving picture into any one of a work movement and a movement section, or even after the work movement division information is generated.

<Work Movement Redivision Processing Unit>

Figure 8:
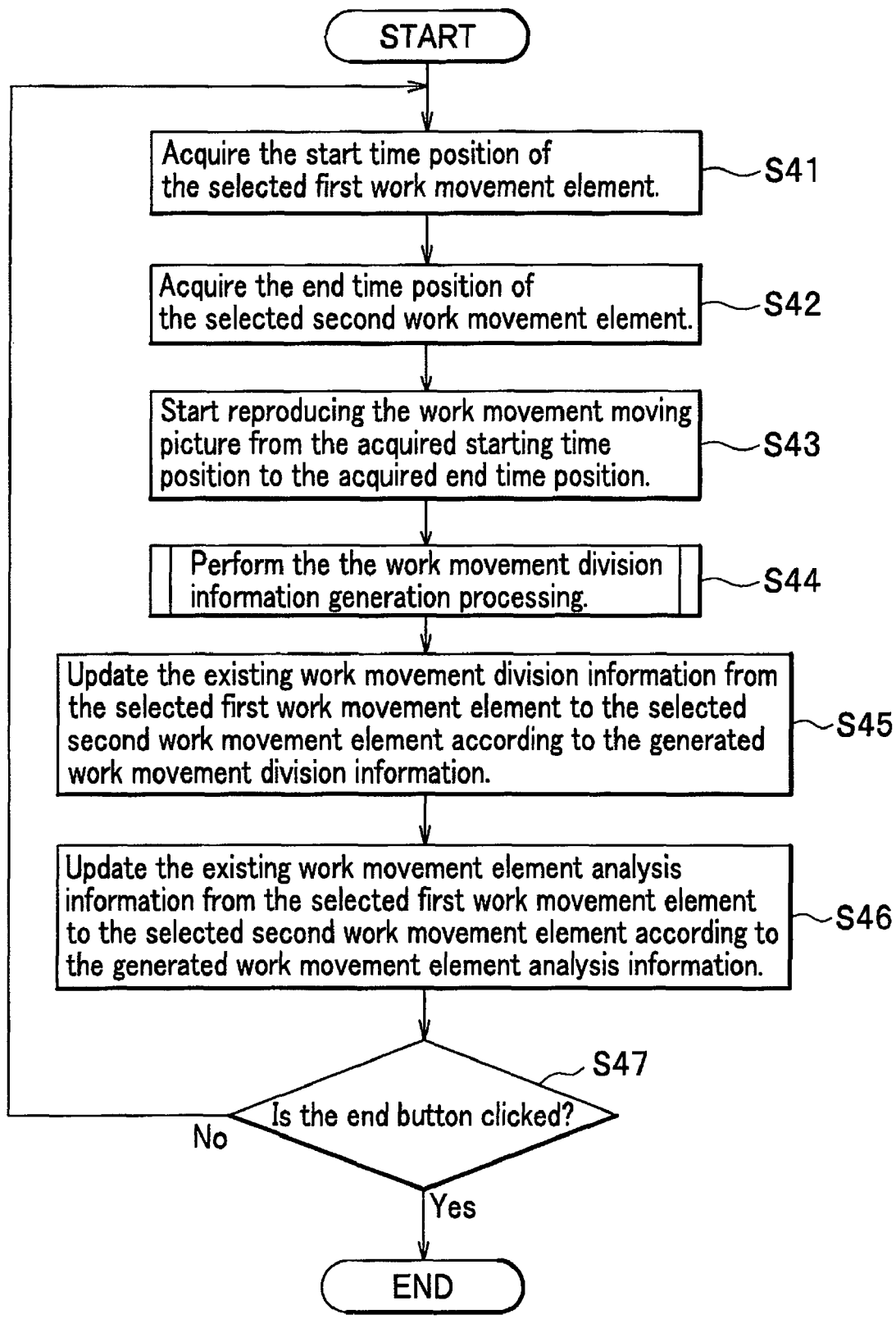
FIG. 8 is a flowchart showing an example of a processing flow of a work movement redivision processing unit in the work movement analysis apparatus of the embodiment.

FIG. 8 is a flowchart showing an example of a processing flow of the work movement redivision processing unit 11d in the work movement analysis apparatus 10. The work movement redivision processing unit 11d is started when an analysis operator selects one or more sequential work movement element names and clicks a redivision start button 144.

In FIG. 8 the processing unit 1 firstly acquires the movement start time position of a first work movement element selected by an analysis operator in work movement analysis information displayed in the work movement analysis information display area 150 (step S41). Then the processing unit 1 acquires the movement end time position of a second work movement element similarly selected (step S42). At this time the second work movement element is a same work movement element as that of the first work movement element or a work movement performed after the first work movement element.

Next, the processing unit 1 starts reproducing the work movement moving picture from the starting time position to the end time position acquired in the previous steps (step S43). Then with respect to the reproduced work movement moving picture, the processing unit 1 performs the work movement division information generation processing (step S44). In other words, the processing unit 1 generates work movement division information with respect to the part of the reproduced work movement moving picture, based on any one of the classification button 120 and the completion button 130 clicked by an analysis operator while inspecting the part of the work movement moving picture.

Next, according to the generated work movement division information, the processing unit 1 updates existing work movement division information from the selected first work movement element to the selected second work movement element (step S45); furthermore, according to work movement division information similarly generated, the processing unit 1 updates existing work movement analysis information from the selected first work movement element to the selected second work movement element (step S46).

Next, the processing unit 1 determines whether or not a redivision end button 145 is clicked (step S47); when the button 145 is not clicked (No in the step S47), the processing returns to the step S41 and the unit 1 again performs the work movement redivision processing thus described; and when the button 145 is clicked (Yes in the step S47), the processing returns to the step S41 and the unit 1 finishes the work movement redivision processing.

In addition, although an illustration is omitted, when an analysis operator clicks the delete button 146 before clicking the end button 145, she/he can cancel an operation performed after starting the redivision.

Thus through the work movement redivision processing unit 11d, an analysis operator can further redivide a work movement, which is divided into one, into a plurality of work movement elements, and for example, redivide two work movement elements into three viewed from another point.

<Work Movement Comparison Processing Unit>

Figure 9:
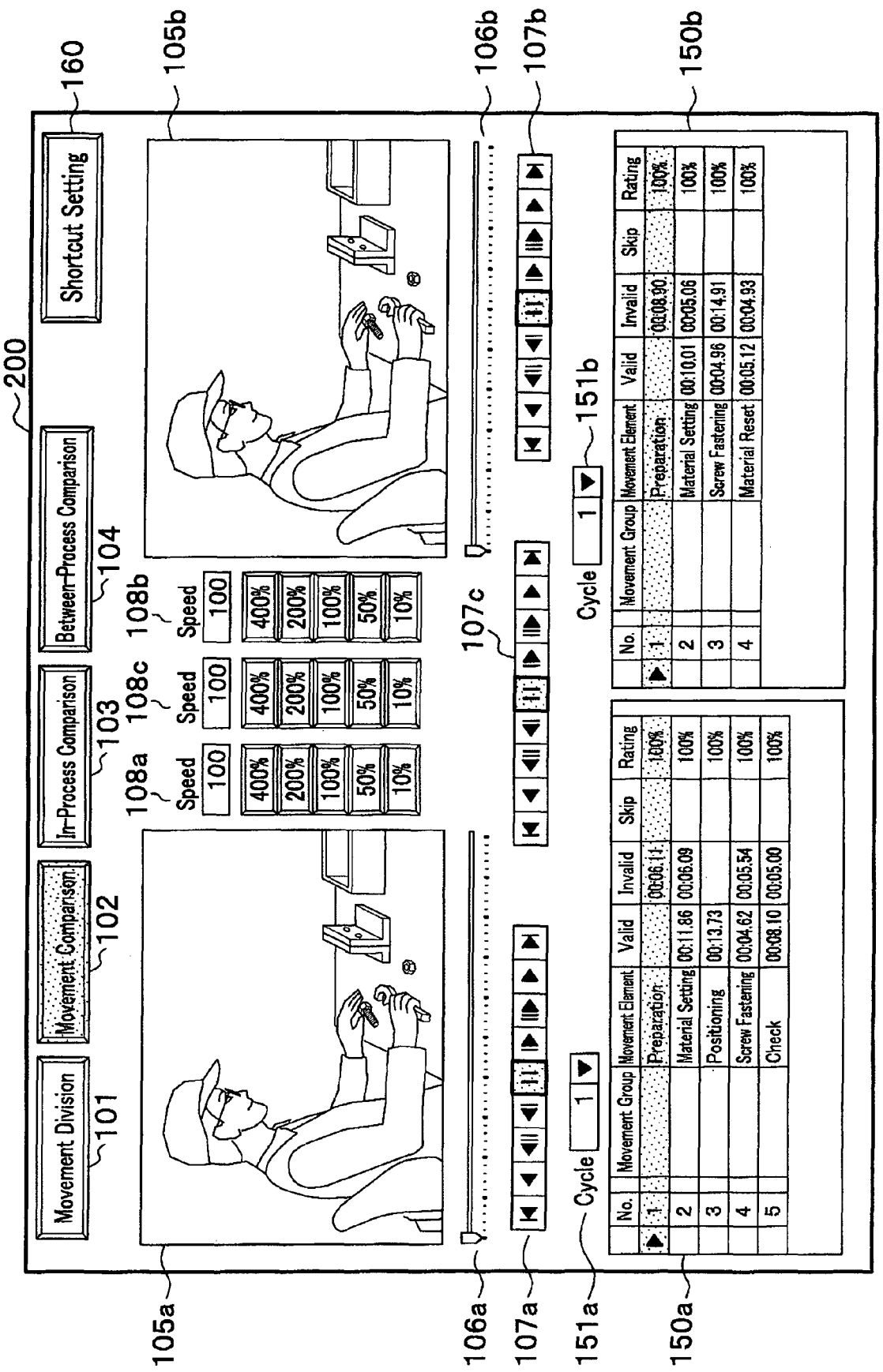
FIG. 9 is an example of a display screen displayed by a work movement comparison processing unit in the work movement analysis apparatus of the embodiment.

FIG. 9 is an example of a display screen displayed by the work movement comparison processing unit 12 in the work movement analysis apparatus 10. As a main function of the work movement comparison processing unit 12, the processing unit 1 concurrently reproduces work movement moving pictures recorded respectively in two moving picture files and displays the concurrently reproduced two moving pictures in parallel in the display unit 3.

As shown in FIG. 9, in a display screen 200 displayed by the work movement comparison processing unit 12 are provided two display areas 105a, 105b so as to be able to concurrently reproduce moving pictures of two work movements. Then in the moving picture display areas 105a, 105b are respectively provided moving picture display position indicators 106a, 106b, moving picture control buttons 107a, 107b, and a reproduction speed setting input box 108a and a reproduction speed button 108b. Furthermore, a moving picture control button 107c and a reproduction speed setting input box and reproduction speed button 108c concurrently having an effect in reproducing moving pictures in both moving picture display areas 105a, 105b are provided. Moreover, each piece of work movement analysis information based on work movement division information included in a project file corresponding to a moving picture file of each work movement moving picture is displayed in the display areas 150a, 150b.

The processing of the work movement comparison processing unit 12 is started by an analysis operator clicking the movement comparison button 102. In other words, when an analysis operator clicks the movement comparison button 102, the processing unit 1 firstly, for example, displays file setting dialog boxes similar to the file setting dialog box 110 of the display screen 100 (see FIG. 2), for example, side by side in left and right (not shown). Consequently, if the analysis operator sets any respective ones of moving pictures and project files using the file setting dialog boxes, the display screen 200 is displayed, and then it becomes possible to concurrently reproduce and compare two work movements of the respective ones.

In addition, with respect to work movement analysis information displayed in the work movement analysis information display areas 150a, 150b, the work movement comparison processing unit 12 may be basically configured not to have a function of editing the analysis information; however, for example, the rating information and the reproduction skip information may also be configured so that numerics in the columns of the rating information and reproduction skip information of each piece of work movement analysis information displayed are appropriately changeable.

Thus in accordance with the work movement comparison processing unit 12, for example, a fresh worker can compare own work movement simply with that of a skilled person, or appropriately change any piece of the rating information and reproduction skip information of own work movement and compare own work movement with that of a skilled person.

<In-Process Comparison Work Movement Processing Unit>

Figure 10:
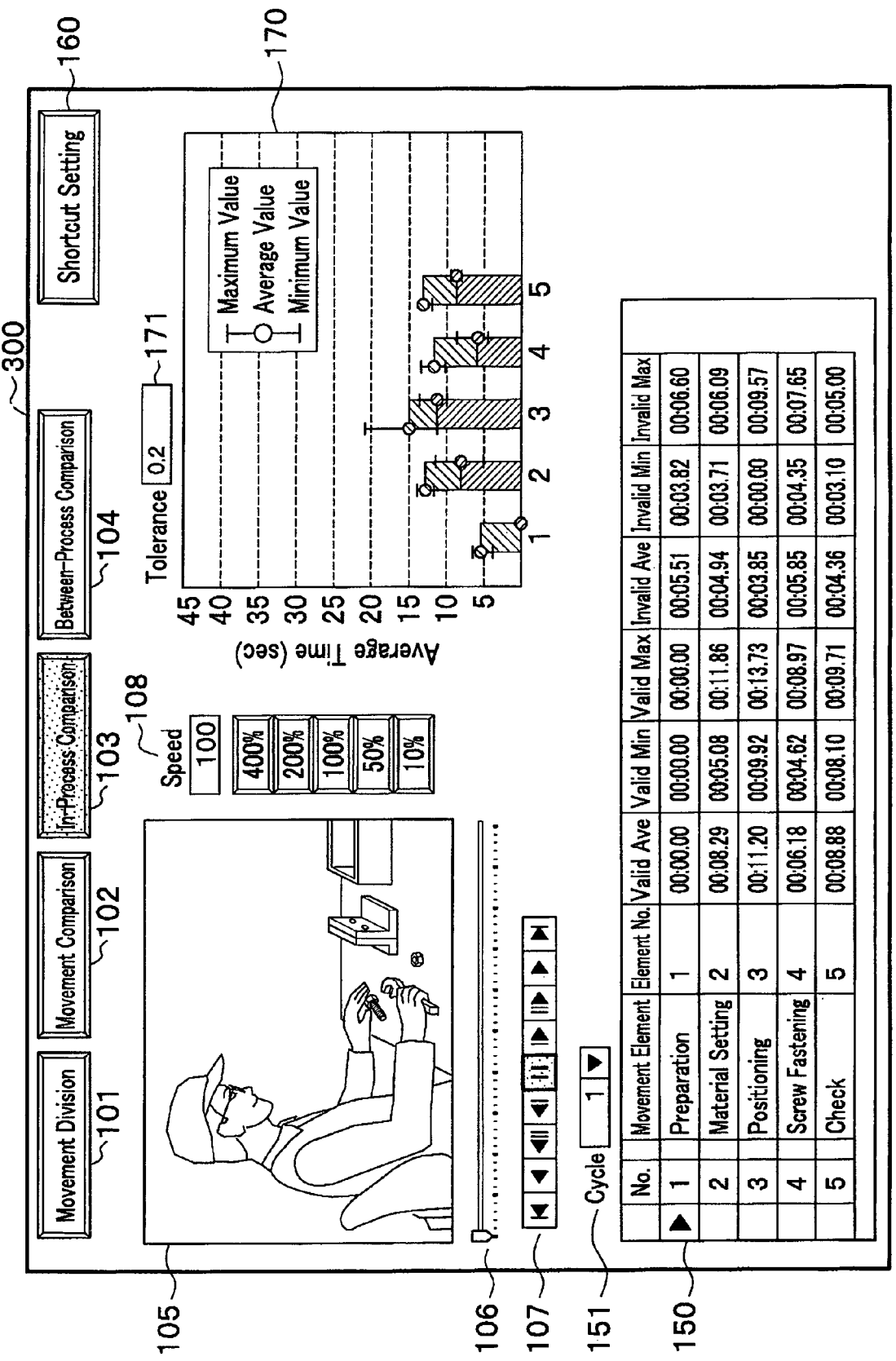
FIG. 10 is an example of a display screen displayed by an in-process comparison work movement processing unit in the work movement analysis apparatus of the embodiment.

FIG. 10 is an example of a display screen displayed by the in-process comparison work movement processing unit 13 in the work movement analysis apparatus 10. As a main function of the in-process comparison work movement processing unit 13, the processing unit 1 calculates statistical information of analysis information related to a movement section with respect to respective work movement elements included in a work movement of a same process and compares and displays the statistical information of the analysis information related to the calculated movement section, based on work movement division information generated by a work movement moving picture at a time when a worker repeats the work movement of the process. In other words, the processing unit 1 calculates and displays the statistical information (hereinafter referred to as movement section analysis statistical information) of the analysis information of a movement section, based on generated work movement division information (that is, a project file).

The processing of the in-process comparison work movement processing unit 13 is started by an analysis operator clicking the in-process comparison button 103. In other words, if the in-process comparison button 103 is clicked, the processing unit 1 firstly displays a file setting dialog box (not shown) similar to the file setting dialog box 110 of the display screen 100 (see FIG. 2).

Consequently, if an analysis operator sets a name of a project file of an object of a current processing in the file setting dialog box, the processing unit 1 reads the project file with the name from the work movement division information storage unit 22. Moreover, the processing unit 1 picks up the moving picture name included in the project file and reads the moving picture with the name from the work movement moving picture storage unit 21. Accordingly, in this case it is not necessary to set the name of a moving picture file from the file setting dialog box.

Thus the project file and moving picture file of a processing object are prepared, the processing unit 1 displays in the display unit 3 a display screen 300 shown in FIG. 10. In other words, in order to reproduce the moving picture, the processing unit 1 displays such as the moving picture display area 105, a moving picture display position indicator 106 a moving picture control button 107, and a reproduction speed setting input box 108, additionally displays work movement analysis information generated by work movement division information included in the project file in the work movement analysis information display area 150, and further displays in a display area 170 movement section analysis statistical information calculated from the generated work movement analysis information.

Here, the movement section analysis statistical information displayed in the display area 170 is an average value, maximum value, and minimum value of a work movement time of each movement section (here, the valid movement and the invalid movement) with respect to each work movement configuring a same work movement when a worker repeats the same work movement. In addition, in FIG. 10 the average value is shown in a bar graph and the maximum value and the minimum value are shown in an error bar graph.

Here, a difference between the maximum value represented in the error bar graph and the average value and a difference between the average value and the minimum value represented in the error bar graph represent a variation of a worker's work movement time, and it can be generally said that the work movement is not stable when the variation is larger. Consequently, in the embodiment an input box 171 is provided for setting a tolerance of the variation in the display screen 300. Then in a case of a predetermined tolerance of the variation being set in the input box 171, the processing unit 1 determines whether or not any one of a difference between a maximum value and an average value and a difference between the average value and a minimum value exceeds a tolerable maximum value ((average value)×(tolerance)) defined by the predetermined tolerance:

(maximum value of work movement time)−(average value)>(average value)×(tolerance), and (average value)−(minimum value of work movement time)>(average value)×(tolerance).

Then as a result of the determination, in a case of any one of a difference between a maximum value and an average value and a difference between the average value and a minimum value exceeding the tolerable maximum value ((average value)×(tolerance)), the bar graph is highlighted, for example, by flickering display. Or, for example, a message such as "the variation of the invalid work of the positioning-work movement element has exceeded the tolerance" is output.

In addition, although in the embodiment a maximum value and minimum value of a work movement are used as variation information, a variance of the work movement may also be alternatively used.

Furthermore, although in the embodiment the processing of the in-process comparison work movement processing unit 13 is configured to start from firstly setting a project file, the processing may also be configured to be continuously performed at a timing when a processing in the work movement division processing unit 11 is finished. In that case it is not necessary to newly perform setting a project file.

Furthermore, in the embodiment the in-process comparison work movement processing unit 13 comprises a function useful for an analysis operator other than the function thus described. For example, when an analysis operator clicks a bar of a bar graph where movement section analysis statistical information displayed in the display area 170, the moving picture of a work movement corresponding to the bar of the bar graph is displayed.

Thus in accordance with the in-process comparison work movement processing unit 13, an analysis operator of a work movement can acquire statistical information such as variation information for every work movement element of a worker's work movement by a simple operation. Accordingly, a worker can objectively know an unstable work movement element of own work and soon check the work movement by the moving picture; therefore, she/he can enhance a work skill in a shorter time. Furthermore, this enables any of an analysis operator and a process supervisor to easily find and analyze a problem and to take countermeasures thereof.

<Between-Process Comparison Work Movement Processing Unit>

Figure 11:
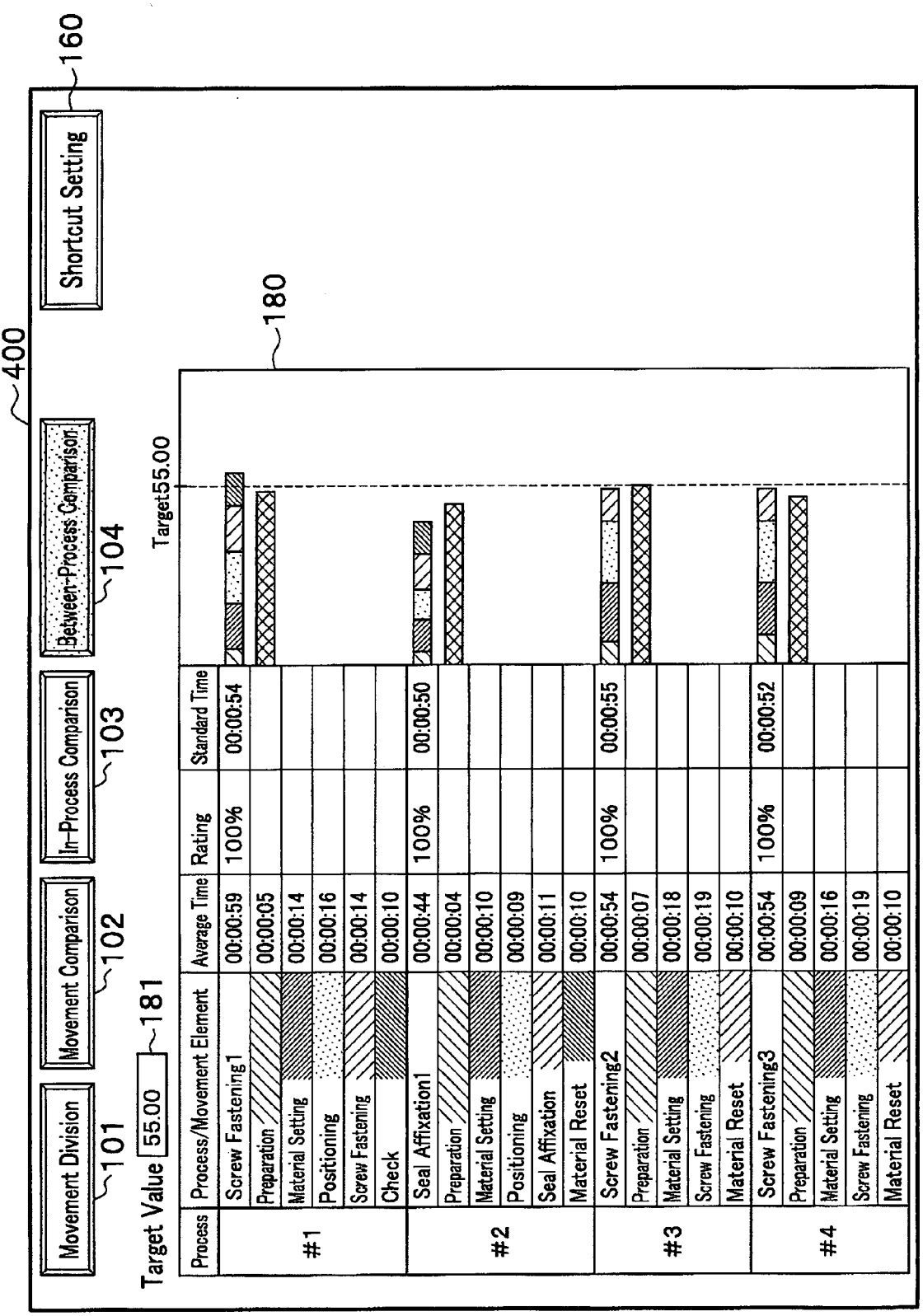
FIG. 11 is an example of a display screen displayed by a between-process comparison work movement processing unit in the work movement analysis apparatus of the embodiment.

FIG. 11 is an example of a display screen displayed by the between-process comparison work movement processing unit 14 in the work movement analysis apparatus 10 of the embodiment. As a main function of the between-process comparison work movement processing unit 14, the processing unit 1 generates an element table of a work movement time of each work movement element, and compares and displays the generated element table according to processes, with respect to work movement division information of a plurality of the processes, that is, with respect to the work movement division information included in a plurality of project files.

The processing of the between-process comparison work movement processing unit 14 is started by an analysis operator clicking the between-process comparison button 104. In other words, if the between-process comparison button 104 is clicked, the processing unit 1 firstly displays a file setting dialog box similar to the file setting dialog box 110 of the display screen 100 (see FIG. 2). Here, because a plurality of project files of a comparison object are requested, the file setting dialog box is displayed by a plurality of times in order to input the names of the plurality of the project files. In addition, because setting a moving picture file is not necessary in this case, the input box 111 for setting the file is not necessary.

Consequently, if an analysis operator sets in the file setting dialog box the names of a plurality of project files which is an object of a current processing, the processing unit 1 reads the plurality of the project files designated by the names from the work movement division information storage unit 22. Then the processing unit 1 calculates for each process an average value of a work movement time of a work movement configuring the process, based on work movement division information included in the project file of the process. Then the processing unit 1 generates for each process work time stack information comprising the identification information of the process, the identification information of the work movement element included in the process, and the average value of the calculated work movement time with respect to each work movement element. Then the processing unit 1 generates the work time element table and stacked bar graph of each process, and displays them as the example of the display screen 400 in FIG. 11. In addition, in displaying the stacked bar graph, it is also possible to display it, considering the rating information.

In the example of FIG. 11 a whole process is configured with processes #1 to #4, and each process is configured with four or five work movement elements. Then the average times of work movement times of each process and each work movement element are displayed, and moreover, stacked bar graphs are displayed, based on the average times. Furthermore, beside the stacked bar graphs are together displayed standard times that are work requirement times of a standard worker. Moreover, in a case of a target value is set in a target value setting box, the value is displayed.

Such a work time element table and a stacked bar graph are considered to be useful for finding and analyzing the problem of a process. In other words, if such stacked bar graphs as in FIG. 11 are displayed, an analysis operator and a worker can recognize at a glance that there exists a problem in a process (#1 process) of a screw fastening 1. Then in that case the problem can be solved, for example, by such putting a more skilled person in charge of the process of the screw fastening 1 or moving some of the work movement elements of the process of the screw fastening 1 to a subsequent process (for example, #2 process).

Consequently, in the process of the between-process comparison work movement processing unit 14, in order to more clearly display whereabouts of the problem for an analysis operator and a worker, a warning message is displayed if there exists a process where the accumulation value (stacked value) of the work movement time has not reached a predetermined target value. In other words, if a target value is set in the target value setting box 181 and there exists a process where the sum (accumulation value) of average values of work movement times of a process has exceeded the set target value, the processing unit 1 highlights the display of the process by such flickering it. Or, for example, such a message as "the process of the screw fastening 1 has not reached the target" is displayed.

Furthermore, in the processing of the between-process comparison work movement processing unit 14 is provided a function that enables an analysis operator to easily rearrange the work movement elements of a process so called "stack breakup" Here, when displaying the stacked bar graph of FIG. 11, in order to facilitate the operation of the "stack breakup," firstly the processing unit 1 individually displays the strips of the graph indicating the average times of the work movement elements of each process as a graphic object to be able to be selected and dragged by such a mouse cursor. Then the processing unit 1 links individual graphic objects indicating the strips of the stacked bar graph of each process with the identification information of the work movement elements included in the each process in the work time stack information. Furthermore, the processing unit 1 links a display area of the stacked bar graph of each process with the identification information of the process.

Consequently, if an analysis operator selects the strip of a stacked bar graph of a first process, drags the selected strip to another second process, and drops it there, the processing unit 1 rearranges the work movement elements of the first and second processes and again displays the stacked bar graphs as work movement elements corresponding to the strip of the first process being moved to the second process.

Figure 12:
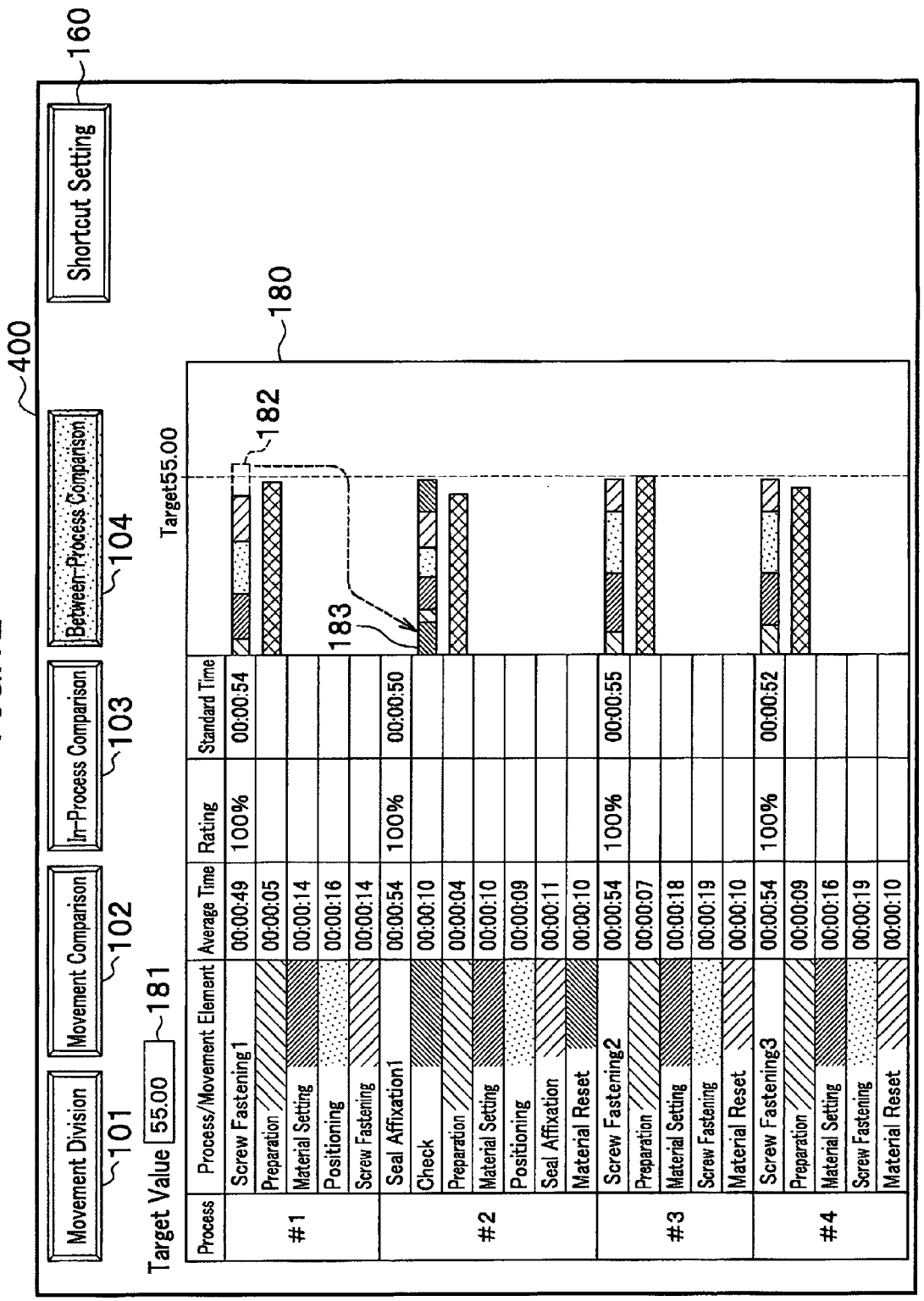
FIG. 12 is a drawing showing an example of breaking up a stacked bar graph and rearranging work movement elements of a process in the embodiment, based on the stacked bar graph sorted according to processes of FIG. 11.

In FIG. 12, for example, in order to achieve the target of the process #1, an analysis operator selects a strip 182 of a stacked bar graph, which is a fifth work movement element "check" of the process, and has dropped on the process #2. In that case the work movement element "check" results in being performed in the process #2, and in FIG. 12, is displayed as a strip 183 of another stacked bar graph.

In other words, when receiving an input indicating that a graphic object (strip of the stacked bar graph) included in the stacked bar graph of a process is selected in the display screen 400 where a between-process comparison stacked bar graph is displayed, the processing unit 1 refers to the work time stack information and acquires the process and the identification information of a work movement linked with the graphic object. Then the processing unit 1 picks up the information (identification information of a work movement and the average value of a work movement time corresponding thereto) of the work movement element of work stack information corresponding to a process and the work movement element instructed by the identification information.

Next, when receiving an input indicating that the selected graphic object is dragged and dropped in the display area of a stacked bar graph of another process, the processing unit 1 acquires the identification information of a process linked with the display area. Then the processing unit 1 shifts the previously picked-up information (identification information of a work movement and the average value of a work movement time corresponding thereto) to the work time stack information of a process instructed by the identification information of the acquired process at this time. Then the processing unit 1 again displays a stacked bar graph, based on the work time stack information after shifted. In addition, in again displaying the stacked bar graph, the processing unit 1 also updates the information of the table displayed at the left side of the graph, based on the work time stack information shifted at that time.

Thus in accordance with between-process comparison work movement processing unit 14, an analysis operator can obtain the element table and stacked bar graph of a work time for each process by a simple operation and also simply perform such an operation as "stack breakup." Thus any of an analysis operator and a process supervisor is enabled to easily find and analyze a problem and to take countermeasures thereof. Then, moreover, any of an analysis operator and a process supervisor can perform a simulation for reconstructing a process in a level of a work movement, and also reconstruct the process, considering any one of an increase and decrease of work manpower.

<Shortcut Key Setting Processing Unit>

FIG. 13 is a drawing showing an example of a display screen displayed by the shortcut key setting processing unit 15 in the work movement analysis apparatus 10. If an analysis operator clicks the shortcut key setting button 160, the processing of the shortcut key setting processing unit 15 is started, and the unit 15 displays a display screen 500 including a shortcut definition table 161 in the display unit 3. In addition, a shortcut key is something that substitutes by a key input thereof a click operation of a button provided in such the display screen 100.

Here, the shortcut definition table 161 is configured with three fields. First and second fields are fields for defining a shortcut key; a third field is a field for associating a command, that is, a button provided in such the display screen 100 with the shortcut key.

A shortcut key is defined for a command (button) usually often used. In the embodiment commands usually often used are such the moving picture control button 107, the classification button 120, and the completion button 130. Consequently, in a shortcut key, for example, may also be fixedly set in advance a definition table such as the shortcut definition table 161 in FIG. 13. However, in some case the shortcut key is difficult to be used by an analysis operator, depending on a difference of her/his being right-handed or left-handed. Consequently, in the embodiment it is configured to be able to freely reset a shortcut key with respect to a command set in advance.

In other words, an analysis operator can edit the shortcut definition table 161, for example, according to the following operations (1) and (2):

(1) in the shortcut definition table 161, selecting and clicking a left end column (if the column is selected, a rightward black triangle mark is displayed in the column); and (2) (if the triangle mark is clicked, a command selection dialog 162 is displayed, in the dialog 162 a command list 164 and an OK button 163 are displayed) then selecting a command from the list 164 and clicking the OK button 163.

At this time the processing unit 1 reads a code of any one of a key operation and mouse operation of a row (row given the rightward black triangle mark) where a column selected in the shortcut definition table shortcut definition table shortcut definition table 161 is included, associates a key operation set in a "control key" column and "key/mouse operation" column of the selected row with the command selected in the command list 164, and allocates the key operation as the shortcut key of the command.

Furthermore, in a case of deleting the allocation of a shortcut key, it suffices in the operation (2) to select "no command" from the command list 164.

Thus any shortcut definition table 161 defined and changed is stored in the shortcut key setting information storage unit 24.

Thus in accordance with the processing of the shortcut key setting processing unit 15, an analysis operator can freely set and change a shortcut key for her/his convenience with respect to a command defined in advance. Accordingly, the processing of the shortcut key setting processing unit 15 can enhance the operationality of the work movement analysis apparatus 10 of the embodiment.

What is claimed is:

1. A work movement analysis method for causing a processing unit having a display unit and a storage unit to perform a work movement division processing in order to divide a worker's work movement acquired as a moving picture into a plurality of movement sections, the method comprising the processing unit performing steps of:

defining a plurality of movement section classification buttons each of which movement section identification information for identifying a of movement sections is allocated to and providing the movement section classification buttons to an operator, wherein the plural types of movement sections include a preparation movement, a valid movement, and an invalid movement;

reading the acquired moving picture of the worker's work movement from the storage unit, the acquired moving picture being taken in advance and stored in the storage unit, and reproducing the acquired moving picture in the display unit;

receiving movement section identification information allocated to a specific movement section classification button selected by the operator;

defining a portion of the moving picture, reproduced before the reception of the movement section identification information and after a previous reception of movement section identification information, as a current movement section and allocating the received movement section identification information to the current movement section;

storing a position in the moving picture reproduced upon the reception of the movement section identification information in the storage unit as an end position of the current movement section; and storing an end position of a previous movement section stored in the storage unit as a start position of the current movement section.

2. The work movement analysis method according to claim 1 further comprising the steps of:

displaying in the display unit a work movement completion button configured to divide the worker's work movement acquired as the moving picture into work movement elements;

dividing the work movement so that one or more of the movement sections divided by the movement section classification button are included in one work movement element before the work movement element completion button being selected and after the work movement element completion button being previously selected in a case of the work movement element completion button being selected by the operator, and after a reproduction of the moving picture being started in a case of the work movement element completion button being not previously selected;

generating work movement analysis information where a movement time for each movement section included in the work movement element is counted, associating the generated work movement analysis information with the work movement element, and displaying the movement element analysis information in a predetermined format.

3. The work movement analysis method according to claim 2 further comprising the steps:

displaying a redivision instruction button in the display unit which the button is configured to redivide a part of the work movement divided into the movement section and the work movement element; and defining a movement section start position of a first movement section as a reproduction start position and a movement section end position of a last movement section a reproduction end position, and reproducing the work movement moving picture from the reproduction start position to the reproduction end position out of a movement section included in the selected work movement element, in the work movement analysis information displayed in a predetermined format in the display unit in a case of sequential one or more of the work movement elements and the redivision instruction button being selected;

performing the work movement division processing and dividing a work movement of a part included in the selected work movement element into the movement sections; and performing the work movement analysis information generation processing, and according to the generated work movement analysis information, updating work movement analysis information corresponding to the selected work movement element out of initial work movement analysis information.

4. The work movement analysis method according to claim 2 further comprising the steps of:

displaying an identification information change instruction button configured to instruct a change of work movement element identification information for identifying the work movement element in the work movement analysis information; and alternately changing two pieces of work movement element identification information selected in the work movement analysis information in a case of two pieces of work movement element identification information different in the work movement element and the identification information change instruction button being selected in the work movement analysis information displayed in a predetermined format in the display unit.

5. The work movement analysis method according to claim 2 comprising the step of:

moving picture reproduction control information including at least one of reproduction speed information, reproduction skip designation information, and work rating information configured to control reproducing the moving picture part corresponding to a divided work movement as the work movement element being further associated with each the work movement element in the work movement analysis information; and the method further comprising the steps, performed by the processing unit, of:

associating and displaying the moving picture reproduction control information with the work movement element in displaying the work movement analysis information in the display unit; and in a case of the moving picture reproduction control information being selected and a value of moving picture reproduction control information for setting the selected moving picture reproduction control information from a predetermined operation input unit being input in the work movement analysis information displayed in the display unit, setting the value of the input moving picture reproduction control information as a value of the selected moving picture reproduction control information.

6. The work movement analysis method according to claim 2 further comprising the steps of:

calculating a variation statistical value representing a variation of the movement section time count information for each the work movement element identification information of the work movement element configuring a work movement of a process with respect to the work movement analysis information generated in a case of the worker repeating the work movement of the process by a plurality of times;

displaying the calculated variation statistical value side by side for each the work movement element identification information; and in a case of a variation tolerance maximum value having been set with respect to the variation of the element section time count information with respect to a variation statistical value of a work movement where the variation statistical value of the movement section time count information becomes larger than an input variation tolerance maximum value out of the variation statistical value for every the displayed work movement element identification information, performing a display of indicating that "the variation statistical value is too large" in the display unit.

7. The work movement analysis method according to claim 2 further comprising the steps of:

accumulating in a plurality of different processes a movement time of each the work movement element configuring a work movement of each of the different processes and generating movement time stack information for the each process, with respect to a plurality of pieces of the work movement analysis information generated in a case of each worker repeating the work movement of the each process by a plurality of times;

displaying side by side the generated movement time stack information with respect to the plurality of the different processes in the display unit; and in a case of a movement time target value having been set with respect to the displayed movement time stack information with respect to movement time stack information of a process where the movement time stacked value becomes larger than the movement time target value out of the displayed movement time stack information of the plurality of the different processes, performing a display of indicating in the display unit that "the movement time stacked value is too large".

8. The work movement analysis method according to claim 7 further comprising the steps of:

in a case of displaying the movement time stack information in the display unit, generating each graphic object to be dragged depending on a movement time of each the work movement element configuring the process with respect to each the work movement element configuring the process, and displaying a movement time stacked bar graph configured by accumulating the generated graphic object for each the process as the movement time stack information; and in a case of one graphic object included in an arbitrary first process being selected and instruction information being input to include the selected graphic object in another second process in the displayed movement time stacked bar graph, again displaying the movement time stacked bar graph as a work movement corresponding to the selected graphic object being deleted from the first process and incorporated in the second process.

9. The work movement analysis method according to claim 2 further comprising the steps of:

displaying shortcut key information in a predetermined format in the display unit, the shortcut key information being configured to associate instruction information input from a predetermined operation input unit and defined in advance with a key code generated by a key possessed by the operation input unit; and in a case of one piece of the instruction information being selected and a key code being input to be associated with the instruction information, associating the key code with the selected instruction information in shortcut key information of a predetermined format displayed in the display unit.

10. A work movement analysis apparatus for dividing a worker's work movement acquired as a moving picture into a plurality of movement sections, the apparatus comprising:

an operator interface having a plurality of classification buttons configured to select one piece of identification information by one click from identification information configured to respectively identify a plurality of kinds of movement sections;

a display unit configured to reproduce the moving picture; and a storage unit configured to allocate movement section identification information defined by a specific movement section classification button to a moving picture of a work having been reproduced before a selection of the specific movement section classification button and to store a position of a moving picture displayed upon the specific movement section classification button being displayed as an end position of a movement section where the movement section identification information is allocated, in a case of the specific movement section classification button being selected by an operator having inspected the reproduced moving picture, wherein the apparatus is configured to define an end position of a previous movement section stored in the storage unit as a start position of a current movement section.

11. A work movement analysis program embodied on a non-transitory computer-readable medium configured to cause a processing unit having a display unit and a storage unit perform a work movement division processing in order to divide a worker's work movement acquired as a moving picture into a plurality of movement sections, the program comprising steps of:

defining a plurality of movement section classification buttons each identification information for identifying a of movement sections is allocated to, and providing the movement section classification buttons to an operator, wherein the plural types of movement sections include a preparation movement, a valid movement, and an invalid movement;

reading the acquired moving picture of the worker's work movement from the storage unit, the acquired moving picture being taken in advance and stored in the storage unit, and reproducing the acquired moving picture in the display unit;

receiving movement section identification information allocated to a specific movement section classification button selected by the operator;

defining a portion of the moving picture, reproduced before the reception of the movement section identification information and after a previous reception of movement section identification information, as a current movement section and allocating the received movement section identification information to the current movement section;

storing a position in the a moving picture reproduced upon the reception of the movement section identification information in the storage unit as an end position of the current movement section; and storing an end position of a previous movement section stored in the storage unit as a start position of the current movement section.

12. The work movement analysis program according to claim 11 configured to cause the processing unit to perform a work movement analysis information generation processing, the program further comprising the steps of:

displaying in the display unit a work movement completion button configured to divide a worker's work movement acquired as the moving picture into work movement elements;

dividing the work movement so that one or more of the movement sections divided by the movement section classification button are included in one work movement element in a case of the movement section classification button being selected before the selection of the work movement element completion button and after a previous selection of the work movement element completion button in a case of the work movement element completion button being selected by the operator, and in another case of the movement section classification button being selected after a start of a reproduction of the moving picture in a case of the work movement element completion button being not previously selected;

generating work movement analysis information where a movement time for each movement section included in the work movement element is counted, associating the generated work movement analysis information with the work movement element, and displaying the generated movement element analysis information in a predetermined format.

13. The work movement analysis program according to claim 12 further comprising the steps of:

displaying a redivision instruction button configured to redivide a part of the work movement divided into the movement section and the work movement element in the display unit; and in a case of one or more of the work movement elements and the redivision instruction button being selected in the work movement analysis information displayed in a predetermined format in the display unit, defining a movement section start position of a first movement section as a reproduction start position and a movement section end position of a last movement section a reproduction end position, and reproducing the work movement moving picture from the reproduction start position to the reproduction end position out of a movement section included in the selected work movement elements;

performing the work movement division processing and dividing a work movement of a part included in the selected work movement elements; and performing the work movement analysis information generation processing, and according to the generated work movement analysis information, updating work movement analysis information corresponding to the selected work movement elements out of initial work movement analysis information.

14. The work movement analysis program according to claim 12 further comprising the steps of:

displaying an identification information change instruction button configured to instruct a change of work movement element identification information for identifying the work movement element in the work movement analysis information; and alternately changing two pieces of work movement element identification information selected in the work movement analysis information, in a case of the two pieces of the work movement element identification information different in the work movement element and the identification information change instruction button being selected in the work movement analysis information displayed in a predetermined format in the display unit.

15. The work movement analysis program according to claim 12 further comprising the step of:

moving picture reproduction control information including at least one of reproduction speed information, reproduction skip designation information, and work rating information configured to control reproducing the moving picture part corresponding to a divided work movement as the work movement element being further associated with each the work movement element in the work movement analysis information; and the program being configured to cause the processing unit further perform the steps of:

associating and displaying the moving picture reproduction control information with the work movement element in displaying the work movement analysis information in the display unit; and in a case of the moving picture reproduction control information being selected and a value of moving picture reproduction control information for setting the selected moving picture reproduction control information from a predetermined operation input unit being input in the work movement analysis information displayed in the display unit, setting the value of the input moving picture reproduction control information as a value of the selected moving picture reproduction control information.

16. The work movement analysis program according to claim 12 further comprising the steps of:

calculating a variation statistical value representing a variation of the movement section time count information for every the work movement element identification information of a work movement of a process with respect to the work movement analysis information generated in a case of the worker repeating the work movement of the process by a plurality of times;

displaying the calculated variation statistical value side by side for every the work movement element identification information; and in a case of a variation tolerance maximum value having been set with respect to the variation of the element section time count information with respect to a variation statistical value of a work movement where the variation statistical value of the movement section time count information becomes larger than an input variation tolerance maximum value out of the variation statistical value for every the displayed work movement element identification information, performing a display of indicating that "the variation statistical value is too large" in the display unit.

17. The work movement analysis program according to claim 12 further comprising the steps of:

accumulating in a plurality of different processes a movement time of each the work movement element configuring a work movement of each of the different processes and generating for the each process movement time stack information for the each process, with respect to a plurality of pieces of the work movement analysis information generated in a case of each worker repeating the work movement of the each process by a plurality of times;

displaying side by side the generated movement time stack information with respect to the plurality of the different processes in the display unit; and in a case of a movement time target value having been set with respect to the displayed movement time stack information with respect to movement time stack information of a process where the movement time stacked value becomes larger than the movement time target value out of the displayed movement time stack information of the plurality of the different processes, performing a display of indicating in the display unit that "the movement time stacked value is too large".

18. The work movement analysis program according to claim 17 further comprising the steps of:

in a case of displaying the movement time stack information in the display unit, generating each graphic object to be dragged depending on a movement time of the work movement element configuring each the process with respect to each the work movement element configuring each the process, and displaying a movement time stacked bar graph configured by accumulating the generated graphic object for each the process as the movement time stack information; and in a case of one graphic object included in an arbitrary first process being selected and instruction information being input to include the selected graphic object in another second process in the displayed movement time stacked bar graph, again displaying the movement time stacked bar graph as a work movement corresponding to the selected graphic object being deleted from the first process and incorporated in the second process.

19. The work movement analysis program according to claim 12 further comprising the steps of:

displaying shortcut key information in a predetermined format in the display unit, the shortcut key information being configured to associate instruction information input from a predetermined operation input unit and defined in advance with a key code generated by a key possessed by the operation input unit; and in a case of one piece of the instruction information being selected and a key code being input to be associated with the instruction information, associating the key code with the selected instruction in shortcut key information of a predetermined format displayed in the display unit.

20. The work movement analysis method according to claim 1 further comprising steps of:

defining as the movement section classification buttons a preparation button corresponding to the preparation movement section, a valid button corresponding to the valid movement section, and an invalid movement button corresponding to the invalid movement section;

providing the preparation, valid, and invalid buttons to a user; and further defining as the movement section classification buttons an ignore button in order to classify the worker's work movement as a movement to be ignored and providing the ignore button to the user.

21. The work movement analysis method according to claim 1, wherein when the previous movement section has not been defined, a start position of the moving picture is stored as the start position of the current movement.

* * * * *